(12) United States Patent
Anders et al.

(10) Patent No.: US 7,077,636 B2
(45) Date of Patent: Jul. 18, 2006

(54) FOAM-IN-PLACE APPARATUS, AND METHODS OF USE AND MANUFACTURE

(75) Inventors: Robert Anders, Phoenix, AZ (US); David Schumm, Scottsdale, AZ (US)

(73) Assignee: 3FI Products LLC, Scottsdale, AZ (US)

( * ) Notice: Subject to any disclaimer, the term of this patent is extended or adjusted under 35 U.S.C. 154(b) by 1 day.

(21) Appl. No.: 10/777,547

(22) Filed: Feb. 12, 2004

(65) Prior Publication Data

US 2005/0181084 A1   Aug. 18, 2005

(51) Int. Cl.
*B28B 1/50* (2006.01)
(52) U.S. Cl. .................. 425/4 R; 425/4 C; 425/547; 425/DIG. 39; 206/219; 206/450; 206/524; 53/450
(58) Field of Classification Search .......... 425/4 R, 425/4 C, 547, DIG. 39; 206/219, 450, 524; 53/450
See application file for complete search history.

(56) References Cited

U.S. PATENT DOCUMENTS 3,419,134 A  * 12/1968 Fitts .......................... 206/221
4,232,788 A  * 11/1980 Roth .......................... 206/524
5,590,816 A      1/1997 Bertram et al.

(Continued)

OTHER PUBLICATIONS

"What old jobs, odd jobs, new jobs await billion-bubble foams?", *Scientific American, Monsanto Report No. 1 on Current Technology*, http://www.ukar.org/tipp10.htm, (Sep. 1973), 7 pgs.

(Continued)

*Primary Examiner*—Robert Davis
*Assistant Examiner*—G. Nagesh Rao
(74) *Attorney, Agent, or Firm*—Sherry W. Schumm

(57) ABSTRACT

A foam-in-place apparatus includes a foam containment unit, a foam precursor storage unit, and a foam precursor heating unit, in one embodiment. During operation, the foam precursor heating unit is activated to provide activation heat to one or more foam precursor components stored within the foam precursor storage unit. The activation heat may cause temperatures of one or more of the foam precursor components to increase to temperatures within an activation temperature range. The pre-heated component or components are combined to produce an expansive foam, which is deployed in the foam containment unit, and which causes the foam containment unit to expand and displace or contour around any physical objects within the expansion limits of the foam containment unit.

29 Claims, 15 Drawing Sheets

U.S. PATENT DOCUMENTS

| | | | | |
|---|---|---|---|---|
| 5,699,902 A * | 12/1997 | Sperry et al. | ................ | 206/219 |
| 5,873,221 A | 2/1999 | Sperry et al. | ................ | 53/472 |
| 5,899,325 A * | 5/1999 | Bertram et al. | ............. | 206/219 |
| 5,913,603 A | 6/1999 | Sperry et al. | ................ | 366/204 |
| 5,986,239 A | 11/1999 | Corrigan, III et al. | ...... | 219/385 |
| 5,996,782 A | 12/1999 | Sperry et al. | ................ | 206/219 |
| 6,065,636 A | 5/2000 | Sperry et al. | ................ | 221/92 |
| 6,272,813 B1 | 8/2001 | Sperry et al. | ................ | 53/440 |
| 6,629,599 B1 * | 10/2003 | Sperry et al. | ................ | 206/219 |
| 6,712,201 B1 * | 3/2004 | Bertram et al. | ............. | 206/219 |
| 6,974,025 B1 * | 12/2005 | Bertram et al. | ............. | 206/219 |
| 2001/0049921 A1 * | 12/2001 | Sperry et al. | ................ | 53/403 |
| 2005/0033207 A1 | 2/2005 | Anders | | |

OTHER PUBLICATIONS

9th Tee Enterprises, Inc.,, "ReHeater Heat Packs", http://www.9thtee.com/reheater.htm, (2000),4 pgs.

Fast Heat Inc., "PCM Thermal Solutions, Heat on Demand Applications", http://www.pcm-solutions.com/space/superc.html, (Jan. 12, 2004),4 pgs.

Semaphore Corporation, "A proposed medical device", http://web.archive.org/web/20040208074817/http://www.semaphorecorp.com/misc/device.html,, (1998),3 pgs.

* cited by examiner

FOAM-IN-PLACE APPARATUS, AND METHODS OF USE AND MANUFACTURE

TECHNICAL FIELD

The present invention relates generally to foam-in-place apparatus, and methods of making and using such apparatus.

BACKGROUND

In the packaging industry, "foam-in-place bag" systems have been developed for immobilizing objects within shipping containers. In an un-activated phase, a foam-in-place bag includes an outer bag and a foam precursor pouch, which is located within the outer bag. The foam precursor pouch holds two chemicals in separation from one another. Prior to use, the foam-in-place bag (and thus the foam precursor pouch) is pre-heated within a pre-heating chamber (e.g., an oven) for a recommended period of time, which can be as long as 30 minutes or more. After that time, the foam-in-place bag is removed from the pre-heating chamber, and the foam precursor pouch is manipulated to cause the two chemicals to combine and react with one another. This reaction produces an expansive foam, which is contained within the outer bag.

Shortly after initiation of the foam production, a user can place the foam-in-place bag within a shipping container in proximity to an object being immobilized. The expansive foam fills the bag, causing the bag to contour around the object. After the foam hardens, the object is at least partially held in place by the bag and hardened foam.

This packaging technology currently relies on the use of pre-heating equipment (e.g., ovens) and trained users. Because the costs for the foam-in-place bags, the pre-heating equipment, and the training can be substantial, this technology is not widely used by the general population. Instead, this technology typically is used by business entities having a significant volume of packaging work.

BRIEF DESCRIPTION OF THE DRAWINGS

The appended claims point out, with particularity, different embodiments of the inventive subject matter described herein. However, the detailed description presents a more complete understanding of various embodiments of the inventive subject matter when considered in connection with the figures, wherein like-reference numbers refer to similar items throughout the figures and:

DETAILED DESCRIPTION

Various embodiments of the inventive subject matter described herein include methods and apparatus for producing rigid, foam-filled structures. Embodiments of the inventive subject matter may be referred to individually and/or collectively herein by the term "invention." Use of this term is merely for convenience and is not intended to voluntarily limit the scope of this application to any single invention or inventive concept if more than one is disclosed.

Various embodiments of foam-in-place apparatus, described herein, are useful to immobilize physical objects, which may include animate or inanimate objects. In other embodiments, foam-in-place apparatus are useful to produce floatation devices. Other applications for foam-in-place apparatus of the various embodiments would be obvious to those of skill in the art, based on the description herein.

Figure 1:
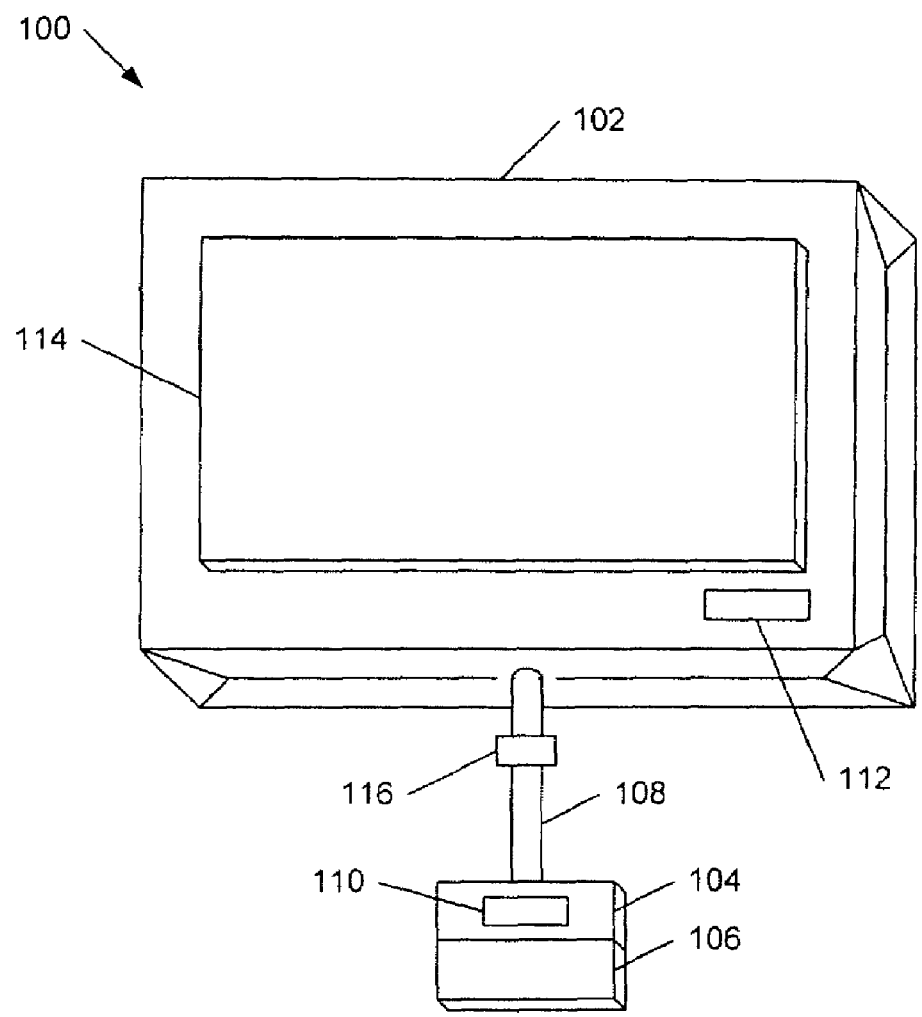
FIG. 1 illustrates a perspective, exterior view of a foam-in-place apparatus, in a pre-activation phase, in accordance with an embodiment of the invention.

FIG. 1 illustrates a perspective, exterior view of a foam-in-place apparatus 100, in a pre-activation phase, in accordance with an embodiment of the invention. Foam-in-place apparatus 100 includes at least one foam containment unit 102, at least one foam precursor storage unit 104, and at least one foam precursor heating unit 106. For the purpose of ease of description, a single foam containment unit, foam precursor storage unit, and foam precursor heating unit are described in conjunction with apparatus 100 and other embodiments, included below. This is not meant to be limiting, and it is to be understood that multiple ones of each of the elements can be included in other embodiments. In the illustrated embodiment, foam precursor storage unit 104 and foam precursor heating unit 106 are shown to be located substantially external to foam containment unit 102. In various embodiments, any or all of the foam containment unit 102, foam precursor storage unit 104, and/or foam precursor heating unit 106 may be secured to a rigid, semi-rigid, or flexible structure or substrate (not illustrated).

Foam containment unit 102 includes a flexible container having an interior cavity, in one embodiment. Foam containment unit 102 is used to at least partially contain a foam material during formation of the foam and thereafter. During formation of the foam, foam precursor components (or a reactant mixture thereof) are injected into the interior cavity of the foam containment unit 102 through a delivery mechanism 108. Delivery mechanism 108 includes one or more channels, tubes, valves, mixing chambers, or other mechanisms for transferring the foam precursor components and/or the resulting foam into the foam containment unit 102. In still another embodiment, foam precursor storage unit 104 opens directly into foam containment unit 102 and/or a mixing chamber within foam containment unit 102, and a separate delivery mechanism (e.g., delivery mechanism 108) is excluded.

When mixed, the foam precursor components chemically react to produce a polyurethane foam, in one embodiment, which expands within the interior cavity of the foam containment unit 102, and causes exterior surfaces of the foam containment unit to contour around and/or push against any objects located within the expansion limits of the foam containment unit 102.

The foam precursor components are stored, prior to mixing, within one or more foam precursor storage units 104 (also referred to herein as "precursor storage unit"). In one embodiment, foam precursor storage unit 104 includes at least two compartments, which hold the foam precursor components in separation from each other and from environmental species prior to activation. In addition, foam precursor storage unit 104 includes one or more physical barriers (e.g., frangible seals, clamped regions, pressure valves, etc.), which can be selectively opened to enable the foam precursor components to combine. In one embodiment, the foam precursor components are released into a mixing chamber (not illustrated in FIG. 1). In another embodiments, one of the foam precursor components is injected into the compartment containing another foam precursor component, and then the mixture is released into a mixing chamber or directly into the foam containment unit 102. Various embodiments of foam precursor storage units are illustrated and described in detail later in conjunction with FIGS. 6–9.

During a time when one or both foam precursor components are located within the foam precursor storage unit, one or both foam precursor components are heated to an "activation temperature" within an "activation temperature range," in one embodiment. Foam precursor heating unit 106 (also referred to herein as "precursor heating unit" and "heating unit") provides thermal energy, also referred to herein as "activation heat," for the purpose of heating one or both foam precursor components. Foam precursor heating unit 106 forms a portion of apparatus 100, and thus is distinguishable from a separate heating chamber, such as the heating chambers used in prior-art systems.

"Activation temperature," as used herein, means a temperature which enhances foam formation, if and when the foam precursor components are combined. In one embodiment, the activation temperature range is approximately 110–140 degrees Fahrenheit. In other embodiments, the activation temperature range can include temperatures higher or lower than the range specified above.

Foam precursor heating unit 106 is located in "thermal proximity" to foam precursor storage unit 104, in one embodiment. The term "thermal proximity" is used herein to mean that the foam precursor heating unit 106 and the foam precursor storage unit 104 are physically positioned so that thermal energy produced by the foam precursor heating unit 106 has the effect of heating one or more of the foam precursor components within the foam precursor storage unit 104. During an un-activated phase, foam precursor heating unit 106 does not provide significant thermal energy above ambient temperatures. Upon activation, foam precursor heating unit 106 generates heat, and this heat has the effect of increasing temperatures of one or both foam precursor components.

In one embodiment, apparatus 100 further includes a temperature indicator 110, located in proximity to foam precursor storage unit 104 and/or foam precursor heating unit 106. Temperature indicator 110 includes a heat-sensitive material and/or a temperature sensor positioned in proximity to the foam precursor storage unit 104 and/or the foam precursor heating unit 106. In addition, in one embodiment, temperature indicator 110 includes a visual indicator, which provides an indication that enables the user to determine whether one or more of the foam precursor components has reached a temperature within an activation temperature range. In one embodiment, the temperature indicator 110 displays a textual message (e.g., "Activate Foam"or "Press #2"), which cues the user how to proceed to use the apparatus. In another embodiment, the temperature indicator 110 includes a linear scale (e.g., a segmented bar or sequence of temperature readings), which indicates the measured temperature contiguously up to the activation temperature.

In still another embodiment, the apparatus 100 includes a time indicator (not illustrated), instead of or in addition to temperature indicator 110. The time indicator cues the user upon expiration of an amount of time that is likely to ensure that one or more of the foam precursor components have reached an activation temperature. In still another alternate embodiment, neither a temperature indicator nor a time indicator are included, and the user simply waits an instructed amount of time before causing the apparatus to proceed to the foam formation state.

As will be described in detail later, foam precursor heating unit 106 is located in contact with one or more surfaces of precursor storage unit 104, in various embodiments. Contact between foam precursor heating unit 106 and foam precursor storage unit 104 can be direct, or one or more intermediate media (including air or material layers) can be located between heating unit 106 and storage unit 104. Various embodiments of foam precursor heating units are illustrated and described in detail later in conjunction with FIGS. 11–16.

The mixture of foam precursor components produces a foam, which expands and presses against the interior surfaces of foam containment unit 102. In one embodiment, the expanding foam produces reaction heat and gaseous by-products (e.g., excess $CO_2$ and/or other gaseous by-products). Gaseous by-products are released from the interior of the foam containment unit 102 through a venting mechanism 112, in one embodiment. Desirably, the venting mechanism 112 enables the gaseous by-products to be released without allowing significant amounts of foam to escape from the foam containment unit 102.

Objects in proximity to the foam containment unit 102 are insulated from the reaction heat, in one embodiment, by an insulating material 114 in contact with the exterior surface of the foam containment unit 102. In another embodiment, the material selected for the foam containment unit 102 can have thermal insulating properties, and a separate insulating material can be excluded. In still another embodiment, the thermal insulating material 114 can be excluded, and the material used for the foam containment unit 102 can have no particular thermal insulating properties.

The expanding foam causes the foam containment unit 102 to expand to form a structure having a shape that is defined by the expansion limits of the foam containment unit 102 and any objects located within those expansion limits, which have sufficient positional resiliency (i.e., objects that are not completely displaced by the expanding foam containment unit). Typical pressures generated by foam expansion may be in a range of approximately 0.2–10.0 psi (pounds per square inch), although pressures greater than or less than this range could be produced, as well. The foam hardens within the foam containment unit 102, producing a rigid structure. In one embodiment, the expansion limits of the foam containment unit 102 produce a rigid structure having a height in a range of about 2"–30", a depth in a range of about 2"–30", and a width in a range of about 2"–30". In other embodiments, the height, depth, and width of the resulting structure can be larger and/or smaller than the above ranges.

In one embodiment, the externally-located foam precursor storage unit 104, and/or foam precursor heating unit 106, and/or the delivery mechanism 108 are readily detachable by use of a connector 116 or a readily-detachable portion. Accordingly, after delivery of the foam precursors and/or the foam mixture, the user can detach the external units 104, 106 and/or the delivery mechanism 108. In another embodiment, the foam precursor storage unit 104, and/or foam precursor heating unit 106, and/or the delivery mechanism 108 are not readily detachable.

Figure 2:
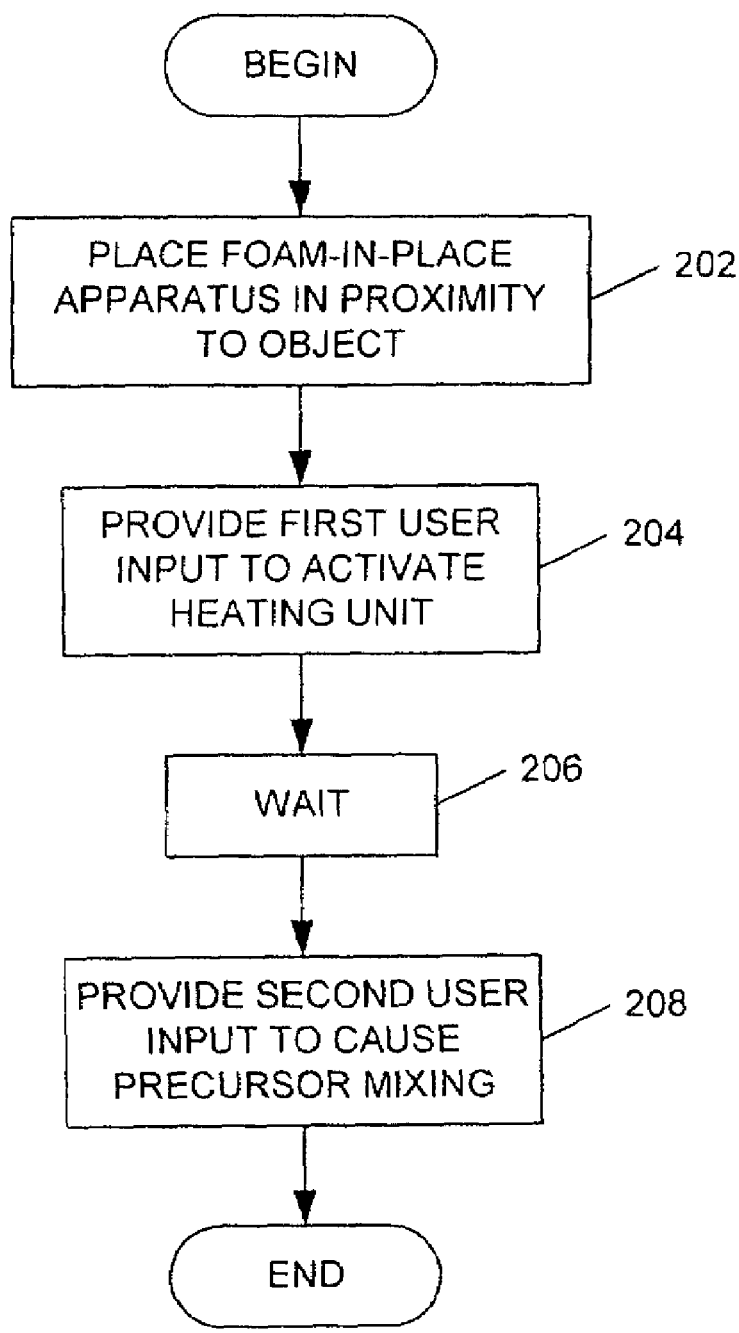
FIG. 2 illustrates a flowchart of a method for using a foam-in-place apparatus, in accordance with an embodiment of the invention.

FIG. 2 illustrates a flowchart of a method for using a foam-in-place apparatus, in accordance with an embodiment of the invention. At any given time, foam-in-place apparatus 100 can be in one of four states: 1) a pre-activation state; 2) a precursor heating state; 3) a foam formation state; and 4) a post-formation state. The method of using the foam-in-place apparatus begins when the foam-in-place apparatus (e.g., apparatus 100, FIG. 1) is in a pre-activation state.

In one embodiment, in block 202, the user places the foam-in-place apparatus in proximity to an object that is desired to be immobilized. In alternate embodiments, the user can place the foam-in-place apparatus in proximity to the object during or after any of blocks 204–208, described below.

In a pre-activation state, foam precursor storage unit (e.g., storage unit 104) contains the foam precursors in separation from each other, and from environmental factors. In addition, foam precursor heating unit (e.g., heating unit 106) is inactive, meaning that the unit is not providing thermal energy that is substantially above ambient temperature. Accordingly, foam containment unit (e.g., containment unit 102) is in an unfilled state.

Advancement to the precursor heating state is initiated by the user of the apparatus, in one embodiment. In block 204, the user provides a first user input to activate the foam precursor heating unit. In one embodiment, the first user input includes the user pressing on a first activation area of the apparatus, which causes the foam precursor heating unit to activate. As will be described later in accordance with various embodiments, the user-supplied pressure may activate the heating unit by breaking a seal, popping a bubble, activating a mechanical agitation device, closing a switch, or otherwise activating the heating unit. Once activated, the foam precursor heating unit provides thermal energy (i.e., activation heat), which enables one or more of the foam precursor components to increase in temperature.

The user may wait until an activation temperature is reached, in block 206. In one embodiment, the user observes a temperature indicator to determine when one or more of the foam precursor components have reached an activation temperature. In an alternate embodiment, the user waits for an amount of time during which it is likely that the activation temperature is reached. This amount of time may depend on ambient temperature or other conditions.

Upon attainment of the activation temperature, advancement to the foam 15, formation state may also be initiated by the user of the apparatus, in one embodiment. To enter the foam formation state, the user provides a second user input, in block 208, which causes one or more physical barriers within the foam precursor storage unit to open, thus enabling the pre-heated foam precursor components to combine. In one embodiment, the second user input includes the user pressing on a second activation area of the apparatus, which causes the foam precursor components to combine. As will be described later in accordance with various embodiments, the user-supplied pressure may cause the components to combine by breaking or removing one or more seals, forcing one or both components through one or more openings (e.g., through use of a clamp, plunger or roller), or otherwise enabling the components to mix. The seals may break due to the pressure of one or more of the foam precursor components pressing against the frangible seals and/or through use of a puncturing mechanism that punctures the seals. In other embodiments, the second user input includes the user removing a clamp or other separation mechanism, which held the foam precursor components in separation.

In another embodiment, mixture and delivery of the foam precursor components can occur as a result of an automatic process. In other words, instead of initiating these events based on a second user input, the events can occur automatically when one or more of the foam precursor components have reached a temperature within the activation temperature range. Accordingly, in this alternate embodiment, the foam-in-place apparatus includes a mechanism (e.g., one or more automatic valves or a metal component that changes its shape when heated) that automatically initiates mixture of the precursor components upon attainment of an activation temperature.

The foam precursor components mix within a mixing chamber, in one embodiment. The mixing chamber can be integral with or connected to the foam precursor storage unit, and the mixing chamber can be located external or internal to the foam containment unit. In an alternate embodiment, the foam precursor components mix within one or both of the compartments that contain the foam precursor components, and then the mixture is extruded through a mixing chamber and/or another opening.

In an alternate embodiment, a user may provide mechanical energy to mix the foam precursor components and deploy the foam. For example, but not by way of limitation, a user may knead, push, shake, or otherwise mechanically manipulate the precursor storage unit to mix the precursors and/or deploy the foam.

When the foam precursor components are mixed, foam formation and expansion begin. The expanding foam is deployed into an interior cavity of the foam containment unit. Mechanical energy for deployment can be generated by the foaming reaction, by the user, by another device, or by a combination of these.

The expanding foam causes the foam containment unit to expand to form a three-dimensional structure. Eventually, the foam substantially hardens, which marks an end to the foam formation state, and an end of the method of FIG. 2.

The post-formation state is a steady state, during which the apparatus provides a three-dimensional, rigid structure that can be used for any of several purposes. For example, but not by way of limitation, the structure can be used to immobilize physical objects (e.g., objects within a shipping container or other space), immobilize a body part (e.g., head/neck, arm, leg, finger, etc.), provide a floatation device (e.g., a buoy, floatation ring, floatation board, etc.), or for other purposes.

In the embodiment illustrated in FIG. 1, foam precursor storage unit 104 and heating unit 106 are located substantially external to foam containment unit 102. In other embodiments, either or both of storage unit 104 and heating unit 106 are located partially or completely internal to foam containment unit 102. One such alternative embodiment is illustrated in FIG. 3.

Figure 3:
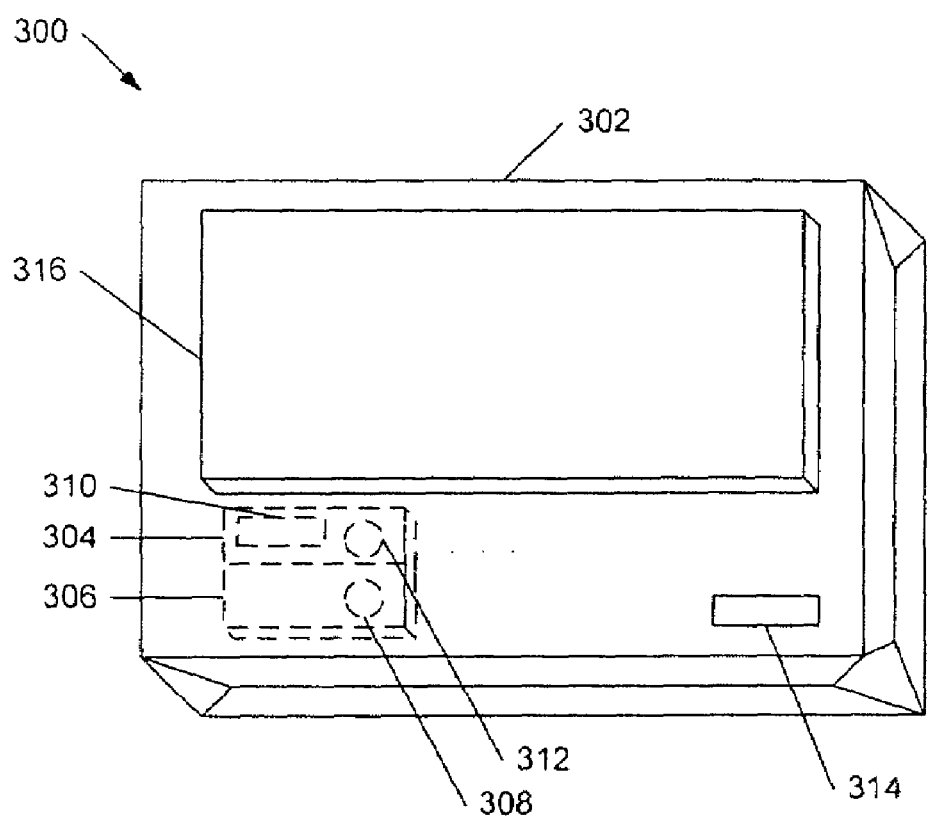
FIG. 3 illustrates a perspective, exterior view of a foam-in-place apparatus, in a pre-activation phase, in accordance with another embodiment of the invention.

FIG. 3 illustrates a perspective, exterior view of a foam-in-place apparatus 300, in a pre-activation phase, in accordance with another embodiment of the invention. Foam-in-place apparatus 300 includes at least one foam containment unit 302, foam precursor storage unit 304, and foam precursor heating unit 306. Each of these elements 302, 304, 306 include characteristics that are similar to the characteristics of corresponding elements described in conjunction with FIG. 1, and with other embodiments, described below.

Located within the foam containment unit 302 are at least one foam precursor storage unit 304 and at least one foam precursor heating unit 306, shown as having dashed outlines to illustrate their hidden location within foam containment unit 302. In one embodiment, foam containment unit 302 and foam precursor storage unit 304 are attached to an interior surface of foam containment unit 302, so that they are held in place with respect to the foam containment unit 302. In another embodiment, foam precursor storage unit 304 and/or foam precursor heating unit 306 are insertable into the interior of foam containment unit 302 via an opening (not illustrated), which can be sealed after insertion of the units 304, 306. In various embodiments, any or all of the foam containment unit 302, foam precursor storage unit 304, and/or foam precursor heating unit 306 may be secured to a rigid, semi-rigid, or flexible structure or substrate (not illustrated).

To activate the apparatus, a user activates foam precursor heating unit 306 by providing a first user input, as described previously in conjunction with FIG. 2. A first visual indicator 308 is visible from or located on a surface of foam containment unit 302, in one embodiment, to indicate the location of the heating unit activation mechanism. After heating unit activation, foam precursor heating unit 306 produces thermal energy. As described previously, heating unit 306 is located in thermal proximity to foam precursor storage unit 304. Accordingly, at least some of the activation heat produced by heating unit 306 is transferred to foam precursor storage unit 304 and, thus, to one or more of the foam precursor components located within the storage unit 304.

In one embodiment, apparatus 300 further includes a temperature indicator 310, visible from or located on a surface of foam containment unit 302 and in proximity to foam precursor storage unit 304. Temperature indicator 310 provides an indication that enables the user to determine whether one or more of the foam precursor components has reached a temperature within an activation temperature range.

In one embodiment, the user initiates foam production by providing a second user input, as described previously in conjunction with FIG. 2. A second visual indicator 312 is visible from or located on a surface of foam containment unit 302, in one embodiment, to indicate where the user should press to cause the foam precursor components to combine. The second user input causes the foam precursor components to combine, which results in the production of the expansive foam.

In one embodiment, the second user input causes the foam precursor components to be released into a mixing chamber (not illustrated), which is integral with or connected to the foam precursor storage unit 304. The mixture is then delivered into the foam containment unit 302 via an opening in the mixing chamber. In another embodiment, the second user input causes the foam precursor components to mix within one or both compartments within which the components are stored, and the mixture exits the compartments through another mixing chamber or other opening.

As described previously, in another embodiment, mixture and delivery of the foam precursor components can occur as a result of an automatic process. In other words, instead of initiating mixture of the components based on a second user input, the events can occur automatically when a detection is made that one or more of the foam precursor components has reached a temperature within the activation temperature range, or that a time period has elapsed.

The mixture of foam precursor components produces a foam, which expands and presses against the interior surfaces of the foam containment unit 302. In one embodiment, the expanding foam produces reaction heat and gaseous by-products. Gaseous by-products are released from the interior of the foam containment unit 302 through a venting mechanism 314, in one embodiment.

Objects in proximity to the foam containment unit 302 are insulated from the reaction heat, in one embodiment, by an insulating material 316 attached to and/or in contact with the exterior surface of the foam containment unit 302. In another embodiment, the material selected for the foam containment unit 302 can have thermal insulating properties, and a separate insulating material 316 can be excluded. In still another embodiment, the thermal insulating material 316 can be excluded, and the material used for the foam containment unit 302 can have no particular thermal insulating properties.

The expanding foam forces the foam containment unit 302 to expand and take a shape defined by the expansion limits of the foam containment unit 302 and/or the surfaces of any objects located in proximity to the foam containment unit 302. The foam hardens within the foam containment unit 302, producing a rigid structure.

FIGS. 1 and 3 illustrate embodiments wherein the foam containment unit and foam precursor heating unit are located external to and internal to the foam containment unit, respectively. In another embodiment, a foam precursor storage unit is located entirely or substantially within the interior cavity of a foam containment unit, and a foam precursor heating unit is located substantially external to the foam containment unit. Accordingly, in such an embodiment, the foam precursor heating unit provides thermal energy to the foam precursor storage unit through a portion of the foam containment unit. In still another embodiment, a foam precursor heating unit is located substantially internal to foam containment unit, and a foam precursor storage unit is located substantially external to the foam containment unit.

In various embodiments, described in detail herein, a foam containment unit and a foam precursor storage unit are distinct units. In another alternate embodiment, a foam containment unit and a foam precursor storage unit are integrated with one another. In other words, the foam containment unit and the foam precursor storage unit are formed by creating seals within the same flexible material sheets. Although such an embodiment is not described in detail herein, it is intended to be included within the scope of the inventive subject matter.

Figure 4:
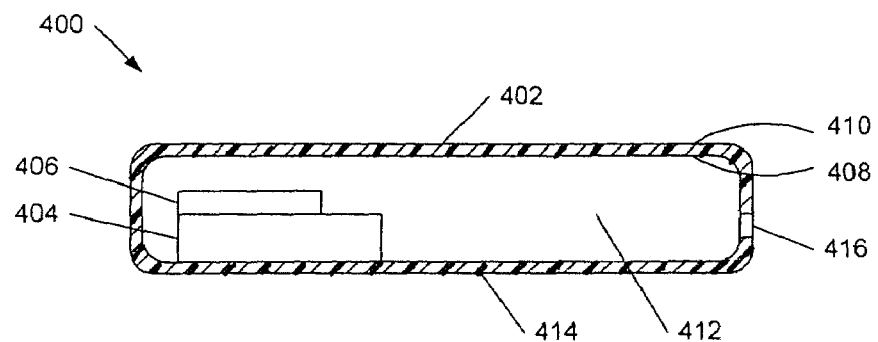
FIG. 4 illustrates a cross-sectional, side view of a foam-in-place apparatus, in a pre-activation phase, in accordance with another embodiment of the invention.
Figure 5:
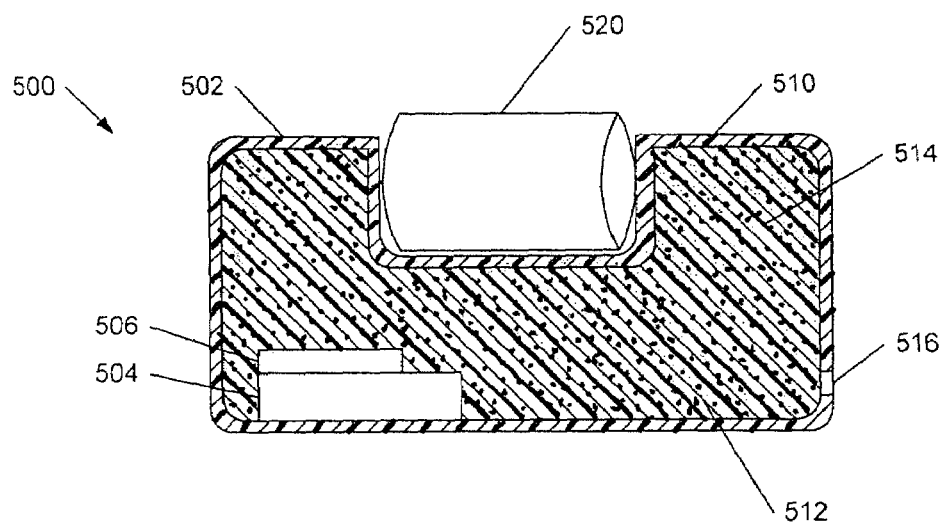
FIG. 5 illustrates a cross-sectional, side view of a foam-in-place apparatus, in a post-formation phase, in accordance with an embodiment of the invention.

For purposes of brevity, FIGS. 4 and 5 continue the illustration and explanation of embodiments where a foam precursor storage unit (e.g., unit 304) and a foam precursor heating unit (e.g., unit 306) are located internal to a foam containment unit (e.g., unit 302). Those of skill in the art would understand, based on the description herein, that modifications can be made for embodiments in which all or portions of the foam precursor storage unit and/or the foam precursor heating unit are located external to the foam containment unit. Accordingly, those modifications are intended to be included within the scope of the inventive subject matter.

FIG. 4 illustrates a cross-sectional, side view of a foam-in-place apparatus 400, in a pre-activation state, in accordance with an embodiment of the invention. Foam-in-place apparatus 400 includes a foam containment unit 402, a foam precursor storage unit 404, and a foam precursor heating unit 406. In various embodiments, any or all of the foam containment unit 402, foam precursor storage unit 404, and/or foam precursor heating unit 406 may be secured to a rigid, semi-rigid, or flexible structure or substrate (not illustrated).

Foam containment unit 402 is defined by an inner surface 408 and an outer surface 410. The inner surface 408, in turn, defines an interior cavity 412, within which a foam is substantially retainable. The interior cavity 412 is capable of expanding to a shape that is defined by expansion limits of the foam containment unit 402.

In one embodiment, foam containment unit 402 includes one or more sheets of flexible material 414, which may be sealed on one, two, three, or all edges to form a bag-like structure. The flexible material 414 includes plastic, in one embodiment. In other embodiments, the flexible material 414 includes metallic foil, a composite material, or any other flexible material that is capable of substantially retaining a foam during foam production. In one embodiment, the flexible material 414 is formed from a single layer. In another embodiment, the flexible material 414 includes multiple-layers, which are laminated or adhered together.

In one embodiment foam containment unit 402 includes a venting mechanism 416, which enables gaseous by-products to escape from the interior cavity 412. Venting mechanism 416 is a one-way mechanism, in one embodiment, which enables gasses to escape, but not to enter the interior cavity 412. In another embodiment, venting mechanism 416 is a two-way mechanism, which enables gasses to escape and enter the interior cavity 412. In still other embodiments, foam containment unit 402 includes multiple venting mechanisms, or does not include a venting mechanism at all.

Located within the foam containment unit 402 are a foam precursor storage unit 404, and a foam precursor heating unit 406. In one embodiment, foam containment unit 402 and foam precursor storage unit 404 are attached to the inner surface 408 of foam containment unit 402, so that they are held in place with respect to the foam containment unit 402. In one embodiment, the positions of the foam precursor storage unit 404 and/or the foam precursor heating unit 406 are indicated by markings (not illustrated) on the outer surface 410 of the foam containment unit 402, to make it easier for a user to identify the locations of the units 404, 406.

In another embodiment, the foam precursor storage unit 404 and/or the foam precursor heating unit 406 are not initially located within the foam containment unit 402. Instead, the foam containment unit 402 includes an opening (not illustrated), which enables insertion of the foam precursor storage unit 404 and/or the foam precursor heating unit 406. Desirably, the opening is sealable, so that it would not allow the foam to escape the foam containment unit 402 during foam formation.

As described previously, in order to activate the apparatus 400, user inputs are provided that cause the foam precursor heating unit 406 to produce thermal energy that is absorbed by the foam precursor storage unit 404. The foam precursors are then mixed and injected into the interior cavity 412 of the foam containment unit 402. The expanding foam forces the inner surface 408 outward toward the expansion limits of the foam containment unit 402. The foam then hardens, producing a rigid structure.

FIG. 5 illustrates a cross-sectional, side view of a foam-in-place apparatus 500, in a post-formation state, in accordance with an embodiment of the invention. Foam-in-place apparatus 500 includes a foam containment unit 502. Foam containment unit 502 includes an interior cavity 512.

After activation of the apparatus 500, the interior cavity 512 is substantially filled with a foam material 514, while allowing gaseous by-products to exit the interior cavity 512 through a venting mechanism 516. As the foam containment unit 502 expands under the pressure of the expanding foam material 514, the outer surface 510 of the foam containment unit 502 may contour around or displace any physical objects (e.g., glass 520) located within the expansion limits of the foam containment unit 502.

In one embodiment, in which a foam precursor storage unit 504 and foam precursor heating unit 506 are activated within the interior cavity 512, foam precursor storage unit 504 and foam precursor heating unit 506 are embedded within the foam material 514 after activation. In other embodiments, where either or both the foam precursor storage unit and foam precursor heating unit are external to the foam containment unit 502, they would not be embedded within the foam material 514 after activation.

In one embodiment, the foam material 514 includes a polyurethane foam. The foam has characteristics of being rapidly-hardening (e.g., less than 1 minute to substantially hardened), rigid, and low-density, in one embodiment. In other embodiments, the foam material 514 may include another type of rapidly-hardening, rigid foam material, as would be obvious to one of skill in the art, based on the description herein.

Polyurethane foam 514 is produced from the combination of two precursor components, in one embodiment. In other embodiments, the polyurethane foam is produced from the combination of more than two foam precursor components. A first precursor component includes a diisocyanate (and/or polyisocyanate), including but not limited to a polymeric MDI, in one embodiment. A second precursor component includes a polyol, in one embodiment, including but not limited to a polyether polyol.

Various additives are included in the second precursor component, in one embodiment. In alternate embodiments, additives are included in the first precursor component or in both the first and second precursor components. In one embodiment, additives are selected from a group of additives that includes a blowing agent precursor, a surfactant (i.e., a lubricant), a cross-linker, and a flame retardant. In other embodiments, more, fewer, or additional additives can be included with included with either or both the first and second precursor components.

The term "Part A" is used herein to refer to the first precursor component (e.g., a diisocyanate) and any additives mixed with the first precursor component. The term "Part B" is used herein to refer to the second precursor component (e.g., a polyol) and any additives mixed with the second precursor component. In one embodiment, additives are mixed only with the second precursor component. In other embodiments, additives are mixed with both precursor components or only with the first precursor component.

When Part A and Part B are combined, various blowing agent precursors combine to generate a chemical blowing agent, which aids in the production of the foam. In one embodiment, the blowing agent is carbon dioxide ($CO_2$). The $CO_2$ is generated by the reaction of diisocyanate in Part A with water ($H_2O$) as a blowing agent precursor in Part B, in one embodiment. In alternate embodiments, other chemical or physical blowing agents can be generated through the reaction of Part A and Part B. Alternative physical blowing agents include, but are not limited to, chlorinated fluorocarbons (CFC), hydrogenated chlorofluorocarbons, and butane, for example, but not by way of limitation.

Various embodiments of foam precursor storage units and foam precursor heating units will now be described in more detail. It is to be understood that those of skill in the art could modify the disclosed embodiments, based on the description herein. Accordingly, all such modifications are intended to be included within the scope of the inventive subject matter.

Figure 6:
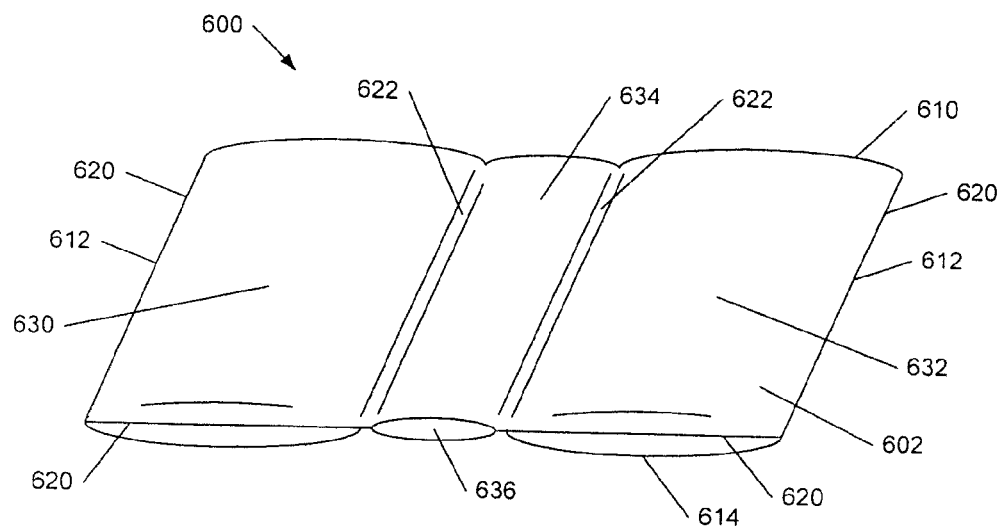
FIG. 6 illustrates a perspective, exterior view of a foam precursor storage unit, in accordance with an embodiment of the invention.

FIG. 6 illustrates a perspective, exterior view of a foam precursor storage unit 600, in accordance with an embodiment of the invention. Foam precursor storage unit 600 is formed from one or more material sheets 602 or films, and is defined by top edge 610, side edges 612, and bottom edge 614.

Material sheet 602 can be formed, for example, from a flexible material which may include one or more layers of polyethylene, polyester, other polymers, polymer resins, metal foil materials, thermoplastic materials, composite materials, other flexible materials, and/or blends or combinations thereof. Variations of the layers are well understood to those of ordinary skill in the polymer arts. In an alternate embodiment, foam precursor storage unit 600 can be formed from a flexible film, rather than a flexible sheet.

In one embodiment, foam precursor storage unit 600 is formed from two coincident material sheets 602, which are closed on all four sides 610, 612, 614 by respective and substantially hermetic edge seals 620. It will be understood that the closed sides 610, 612, 614 could also be formed by folding the sheet material 602 (e.g., three sealed edges and one folded edge), or by using tube stock (e.g., two folded edges and two sealed ends) or by any other similar arrangement. Said generically, the foam precursor storage unit 600 includes a top portion and a bottom portion formed from a flexible material.

In one embodiment, one or more frangible seals 622 are also formed between the coincident material sheets 602. Seals 620, 622 define two or more compartments 630, 632, within which Part A (including a first foam precursor) and Part B (including a second foam precursor) can be contained, respectively. In one embodiment, frangible seals 622 at least partially define a mixing chamber 634.

During operation, when pressure is applied to foam precursor storage unit 600, frangible seals 622 at least partially break, producing openings between compartments 630, 632 and the interior of mixing chamber 634. In another embodiment, frangible seals 622 are punctured by a puncturing mechanism that is responsive to the second user input. In still another embodiment, one or more clamps (not illustrated) are used to provide seals 622, and openings are produced between compartments 630, 632 and the interior of mixing chamber 634 by removing the clamps.

Part A and Part B enter mixing chamber 634 through the openings and combine. The combination of Part A and Part B produces a foam, which is extruded through an opening 636 in the mixing chamber 634. In one embodiment, the opening 636 enables the foam to enter another mixing apparatus (not illustrated) and/or foam containment unit (not illustrated).

In an alternate embodiment, frangible seals could exist between the interiors of compartments 630, 632 and a mixing apparatus other than mixing chamber 634. For example, in one embodiment, a static mixer (not illustrated) is connected to foam precursor storage unit 600, and when the frangible seals are broken, Part A and Part B enter the static mixer. An embodiment of a static mixer is described in conjunction with FIG. 10. In another embodiment, an inter-compartmental frangible seal can exist between compartments 630, 632, and when the frangible seal is broken, Part A and/or Part B enter the other compartment, producing the foam reaction. The resulting foam can be extruded through another opening (not illustrated) in a compartment 630, 632.

Figure 7:
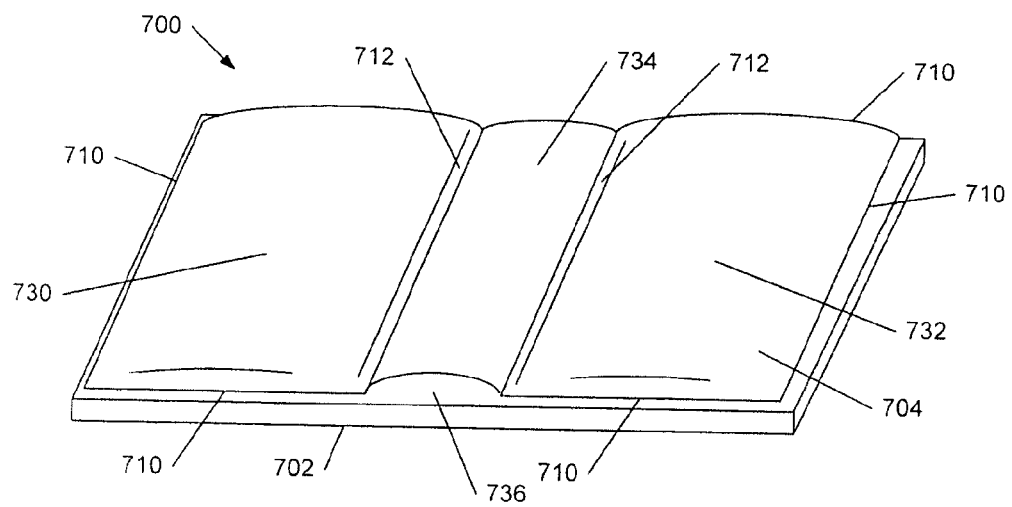
FIG. 7 illustrates a perspective, exterior view of a foam precursor storage unit, in accordance with another embodiment of the invention.

FIG. 7 illustrates a perspective, exterior view of a foam precursor storage unit 700, in accordance with another embodiment of the invention. Foam precursor storage unit 700 is similar to the foam precursor storage unit 600 illustrated in FIG. 6, except that at least one side of the foam precursor storage unit 700 of FIG. 7 includes a rigid material, rather than a flexible material. For example, a bottom side of foam precursor storage unit 700 can include a rigid plate 702 formed from a rigid plastic, metal, or other material. A flexible sheet 704 is connected to the rigid plate 702, forming stable edge seals 710 and frangible seals 712, which are similar in function to the stable and frangible seals 620, 622 described in conjunction with FIG. 6. Said generically, the foam precursor storage unit 700 includes a top portion formed from a flexible material and a bottom portion formed from a substantially rigid material.

The flexible sheet 704 is tented over the rigid plate 702, so that the stable and frangible seals 710, 712 define compartments 730, 732. When pressure is applied to flexible sheet 704, the frangible seals 712 form openings, which enable Part A and Part B to combine within mixing chamber 734. The resulting foam is extruded through an opening 736 of mixing chamber 734. In an alternate embodiment, the functionality of frangible seals 712 can be achieved using one or more removable clamping mechanisms (not illustrated).

In an alternate embodiment, frangible seals could exist between the interiors of compartments 730, 732 and a mixing apparatus other than mixing chamber 734. For example, in one embodiment, a static mixer (not illustrated) is connected to foam precursor storage unit 700, and when the frangible seals are broken, Part A and Part B enter the static mixer. An embodiment of a static mixer is described in conjunction with FIG. 10. In another embodiment, an inter-compartmental frangible seal can exist between compartments 730, 732, and when the frangible seal is broken, Part A and/or Part B enter the other compartment, producing the foam reaction. The resulting foam can be extruded through another opening (not illustrated) in a compartment 730, 732.

In other embodiments, additional or different portions of the foam precursor storage unit can be substantially rigid. This includes, but is not limited to, portions of the top surface of the foam precursor storage unit. In still other embodiments, openings between the interiors and exteriors of the foam precursor compartments can be formed from mechanisms other than frangible seals. For example, but not by way of limitation, openings can be formed using tongue-and-groove connectors, pressure valves, and/or other types of mechanisms.

Figure 8:
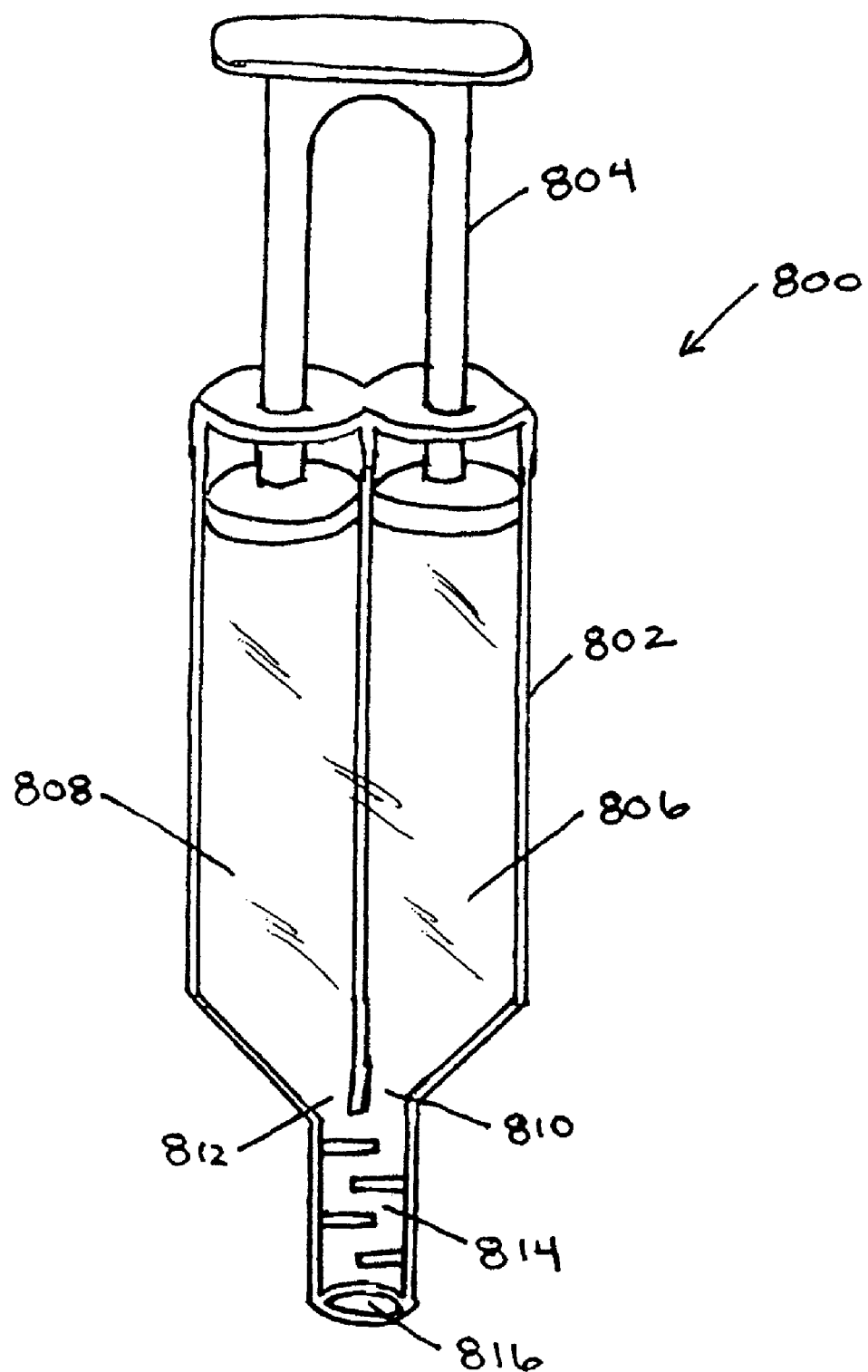
FIG. 8 illustrates a perspective, exterior view of a foam precursor storage unit, in accordance with an embodiment of the invention.

FIG. 8 illustrates a perspective, exterior view of a foam precursor storage unit 800, in accordance with still another embodiment of the invention. Foam precursor storage unit 800 includes a multi-chamber syringe 802 and a multi-part plunger 804.

In one embodiment, with the multi-part plunger 804 in a retracted position, Part A is containable within a first chamber 806, and Part B is containable within a second chamber 808 of the multi-chamber syringe 802. When the multi-part plunger 804 is depressed, Part A and Part B are extruded through openings 810, 812 in the respective chambers 806, 808. Openings 810, 812 may include a frangible or pierceable barrier.

In one embodiment, openings 810, 812 provide entry into a mixing chamber 814, which can be integral with or attached to the multi-chamber syringe 802. In one embodiment, mixing chamber 814 is a static mixer. Other types of mixing chambers are used in other embodiments. The combined Part A and Part B produce a foam, which is extruded through an opening 816 in the mixing chamber 814. The opening 816 enables the foam to enter a foam containment unit.

Figure 9:
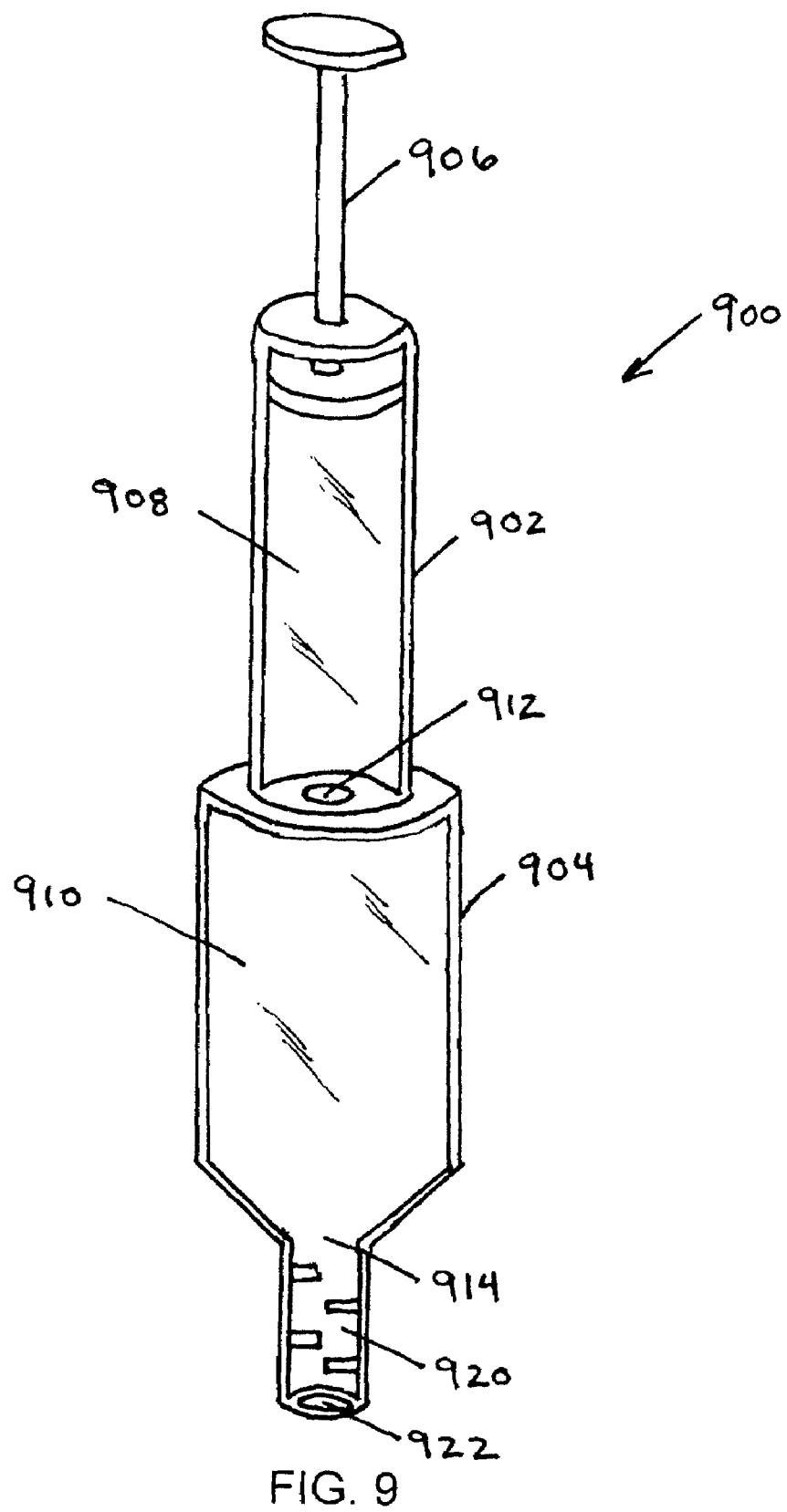
FIG. 9 illustrates a perspective, exterior view of a foam precursor storage unit, in accordance with an embodiment of the invention.

FIG. 9 illustrates a perspective, exterior view of a foam precursor storage unit 900, in accordance with an embodiment of the invention. Foam precursor storage unit 900 includes a first syringe 902, a second syringe 904, and a plunger 906.

In one embodiment, with the plunger 906 in a retracted position, Part A or Part B can be contained within a first chamber 908 of the first syringe 902. The other part (Part B or Part A, respectively) can be contained within a second chamber 910 of the second syringe 904. Plunger 906 can be depressed into the first chamber 908 within the first syringe 902. When plunger 906 is depressed, the contents of the first chamber 908 are extruded through an opening 912 in the first syringe 902 into the second chamber 910 of the second syringe 904. Opening 912 may include a frangible or pierceable barrier.

The second chamber 910 functions as a mixing chamber for Part A and Part B, in one embodiment. The reaction pressure forces the resulting foam through an opening 914 in the second syringe 904. In one embodiment, ejection of the foam and/or precursor components is facilitated by depressing the first syringe 902 into the second chamber 910 of the second syringe 904. Accordingly, the first syringe 902 functions as a plunger, in one embodiment, which forces the contents of the second chamber 910 out through opening 914. Opening 914 may include a frangible or pierceable barrier.

In one embodiment, opening 914 provides entry into a mixing chamber 920, which can be integral with or attached to the second syringe 904. In one embodiment, mixing chamber 920 is a static mixer. Other types of mixing chambers are used in other embodiments. The combined Part A and Part B produce a foam, which is extruded through an opening 922 in the mixing chamber 920. The opening 922 enables the foam to enter a foam containment unit. In an alternate embodiment, a separate mixing chamber 920 is excluded, and the foam and/or precursor components enter the foam containment unit through opening (e.g., opening 914) in the second syringe 904.

Figure 10:
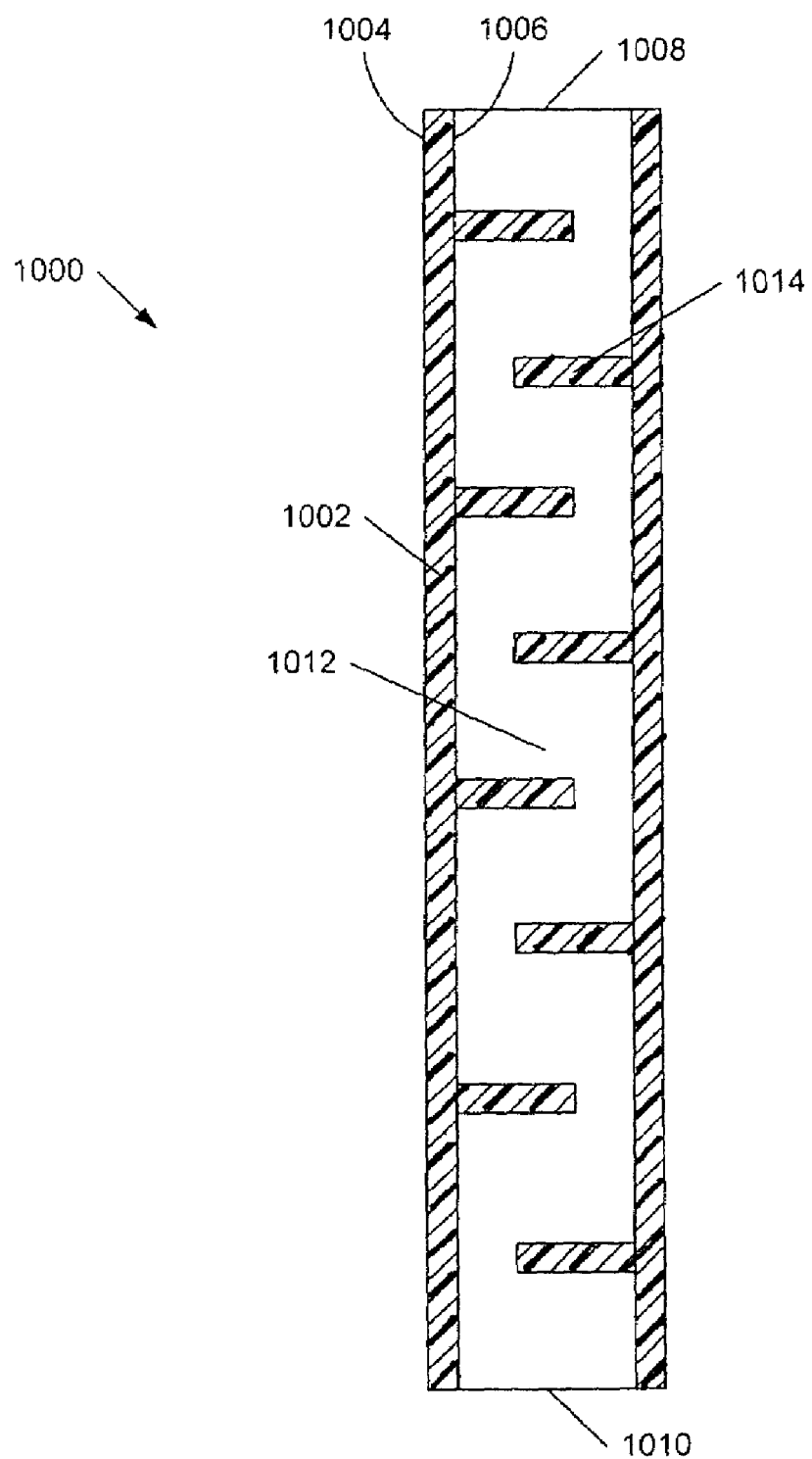
FIG. 10 illustrates a perspective, exterior view of a foam precursor mixing chamber, in accordance with an embodiment of the invention.

In various embodiments, after Part A and Part B are extruded from their respective storage compartments, they enter a mixing chamber. Any of a variety of different types of mixing chambers could be used, as would be obvious to those of skill in the art based on the description herein. For example, a mixing chamber could simply be an area into which both Part A and Part B are extruded (e.g., mixing chamber 634, FIG. 6). In another embodiment, which is illustrated in FIG. 10, below, a "static mixer" can be used to combine Part A and Part B. In still other alternate embodiments, other types of mixing chambers could be used to combine Part A and Part B. For example, but not by way of limitation, a "dynamic mixer" could be used, having component parts that move relative to one another. It would be obvious to one of skill in the art, based on the description herein, that other types of mixing chambers alternatively could be used.

FIG. 10 illustrates a cross-sectional, side view of a foam precursor mixing chamber 1000, in accordance with an embodiment of the invention. Foam precursor mixing chamber 1000 can be referred to as a "static mixer," as its component parts do not move relative to one another. Instead, mixing is achieved by forcing the components through a series of turns (e.g., a "tortured chamber").

Mixing chamber 1000 includes an outer shell 1002, defined by an outer surface 1004 and an inner surface 1006. Outer shell 1002 includes one or more entry openings 1008 at one end of the outer shell 1002, and one or more exit openings 1010 at another end of the outer shell 1002.

The inner surface 1006 defines an interior cavity 1012. Located within the interior cavity 1012 are guiding structures 1014, which cause components that are injected into the entry opening 1008 to travel through a series of turns in order to reach the exit opening 1010. By traveling through the series of turns, distinct components can be effectively mixed by traveling through the mixing chamber 1000. The outer shell 1002 and/or the guiding structures 1014 can be formed from plastic, metal, a composite material, or any of a number of materials having sufficient rigidity.

Foam formation is enhanced by pre-heating one or both foam precursor components (i.e., Part A and/or Part B) to a temperature within an activation temperature range. In prior-art systems, pre-heating is achieved by placing the entire foam containment unit into a heating chamber, such as an oven, for a period of time sufficient to raise the temperature of the foam precursor components. After that time, the foam containment unit is removed from the heating chamber, and pressure is applied to a precursor storage unit within the foam containment unit to force the precursors to combine and produce a foam.

In accordance with embodiments of the present invention, a foam precursor heating unit forms a portion of the foam-in-place apparatus, thus eliminating the need for a heating chamber to pre-heat the precursor components. In various embodiments, the foam precursor heating unit is positioned in thermal proximity to the foam precursor storage unit. When the foam precursor heating unit is activated, it produces activation heat in the form of thermal energy, at least some of which is absorbed by one or more of the foam precursor components. This thermal energy causes one or more of the foam precursor components to attain a temperature within an activation temperature range. The foam precursor components are then combined, according to embodiments described above and/or using other mechanisms, and a foam is produced.

FIGS. 11–16 illustrate various embodiments for foam precursor heating units. The physical configuration and dimensions of a foam precursor heating unit depend on the physical configuration and dimension of a foam precursor storage unit, to which the heating unit is providing thermal energy. In one embodiment, the configuration and size of the foam precursor heating unit are designed so that the heating unit is capable of supplying an adequate amount of activation heat to raise the temperature of one or more foam precursor components to a temperature within the activation temperature range. Although various examples are provided below, these examples are not meant to be limiting. Rather, it would be obvious to one of skill in the art, based on the description herein, how to modify the example embodiments to adapt to providing thermal energy for various foam precursor storage units.

Figure 11:
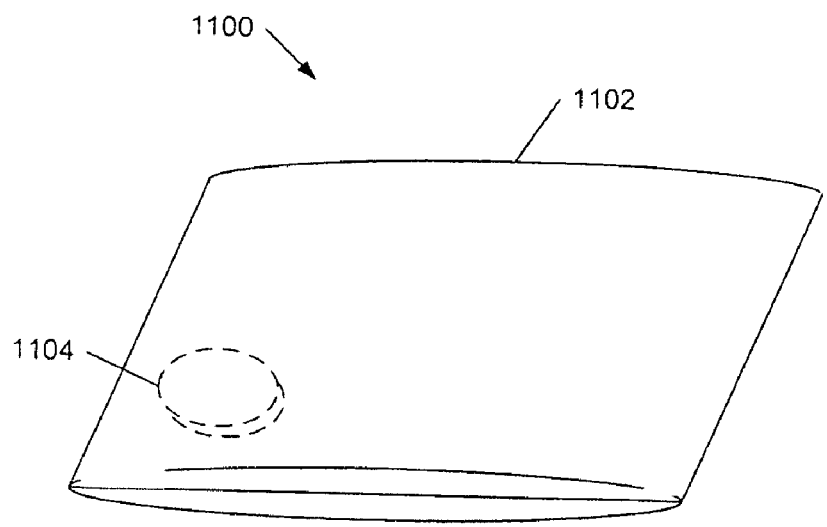
FIG. 11 illustrates a perspective, exterior view of a foam precursor heating unit, in accordance with an embodiment of the invention.
Figure 12:
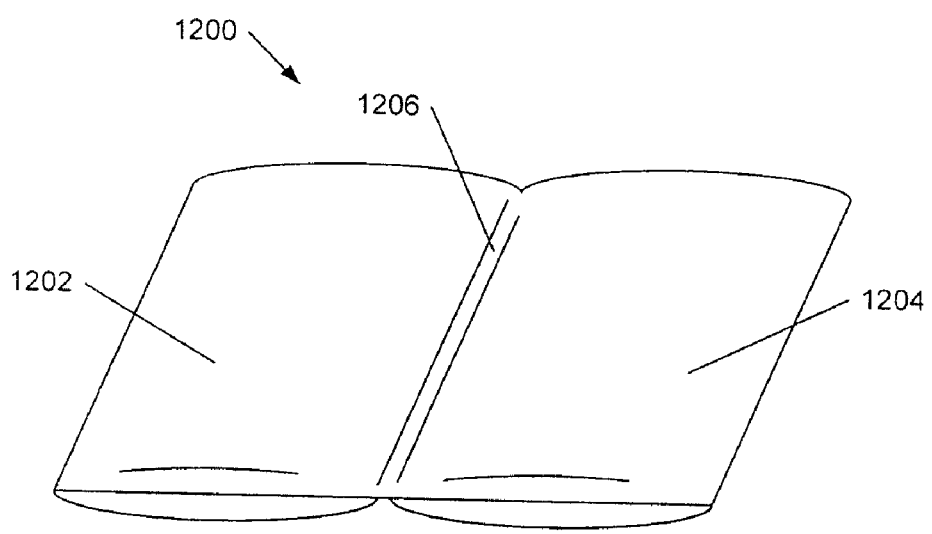
FIG. 12 illustrates a perspective, exterior view of a foam precursor heating unit, in accordance with another embodiment of the invention.
Figure 13:
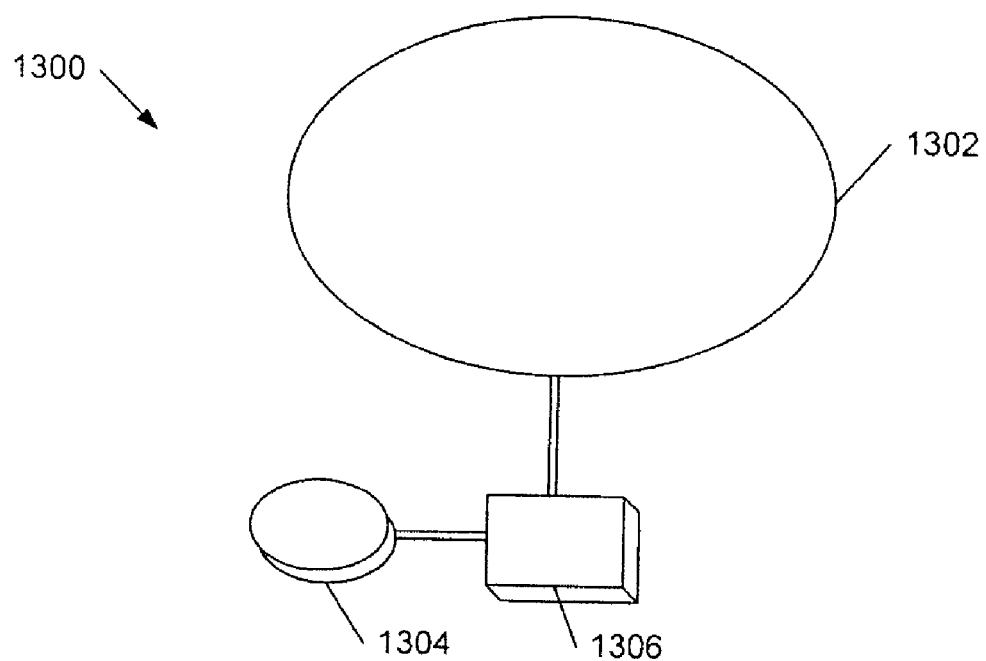
FIG. 13 illustrates a perspective, exterior view of a foam precursor heating unit, in accordance with another embodiment of the invention.
Figure 14:
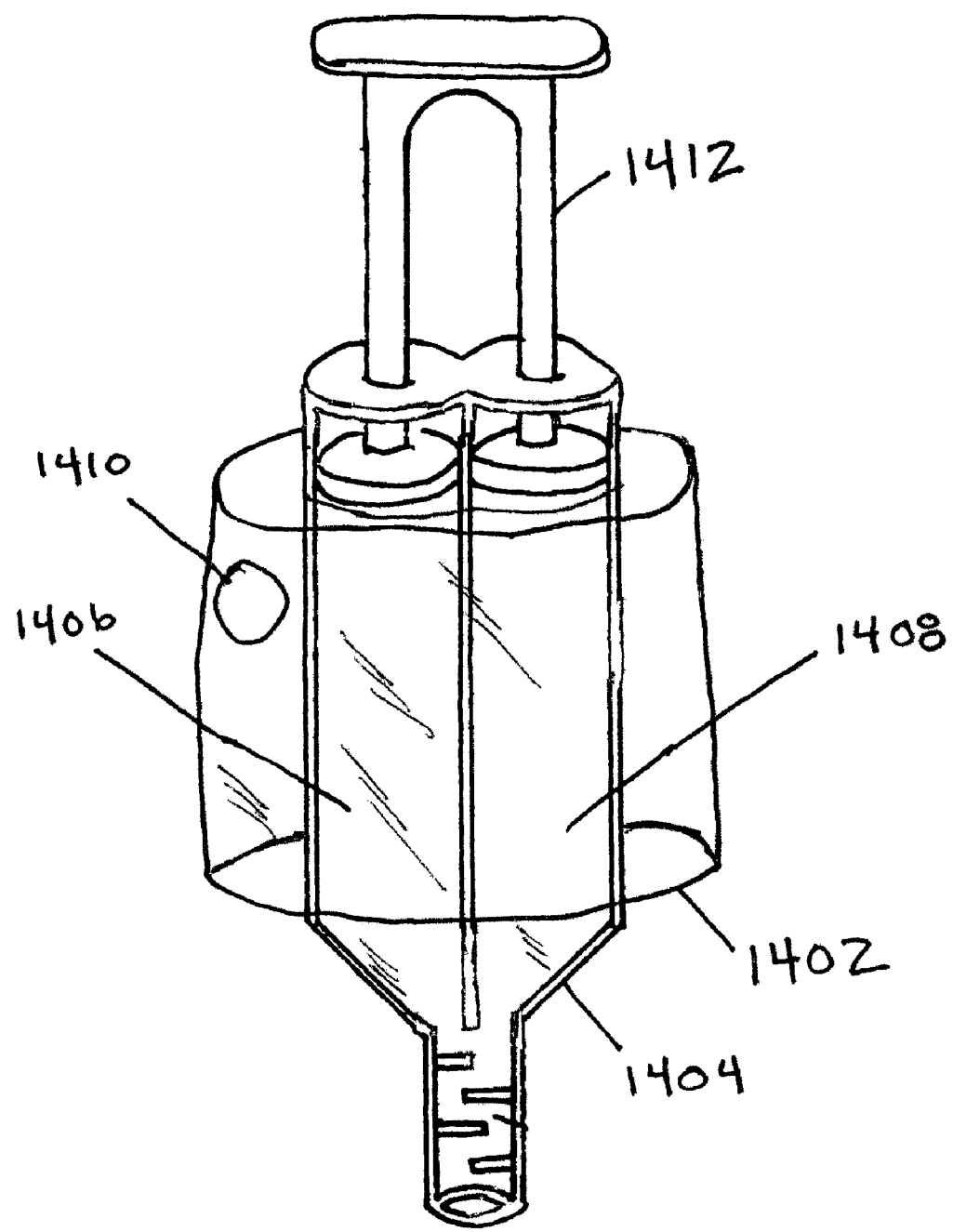
FIG. 14 illustrates a perspective, exterior view of a foam precursor heating unit located in proximity to a foam precursor storage unit, in accordance with an embodiment of the invention.
Figure 15:
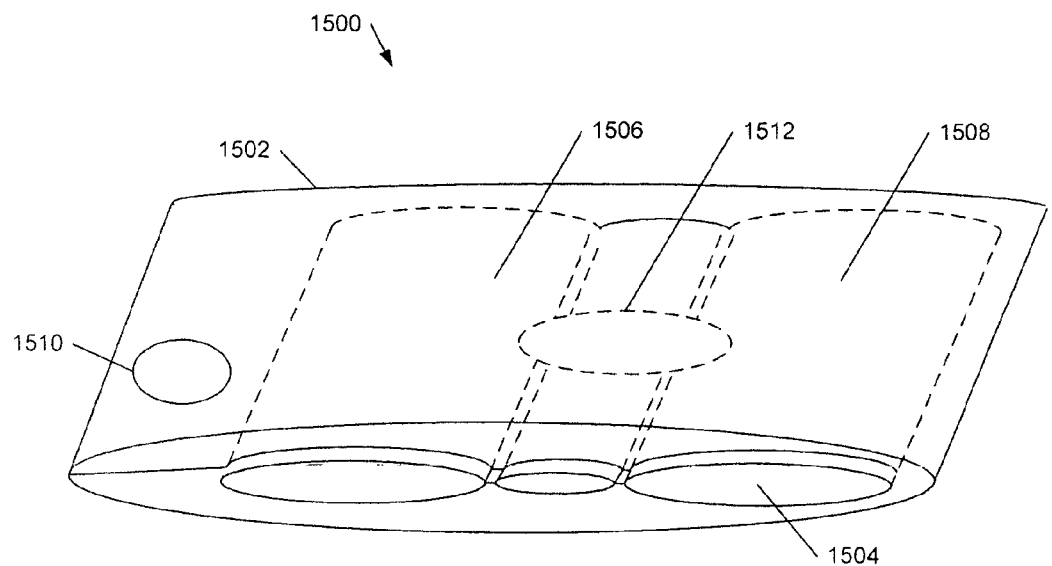
FIG. 15 illustrates a perspective, exterior view of a foam precursor heating unit located in proximity to a foam precursor storage unit, in accordance with another embodiment of the invention.
Figure 16:
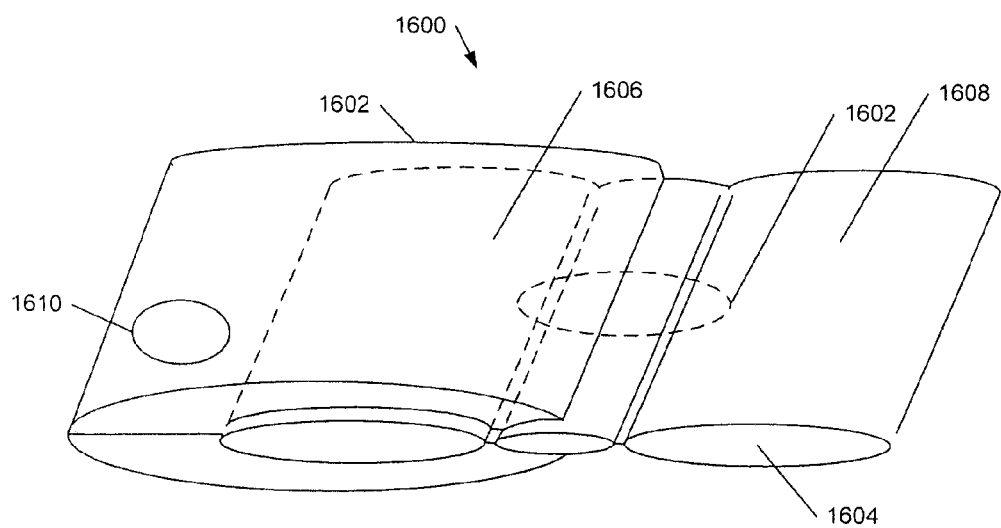
FIG. 16 illustrates a perspective, exterior view of a foam precursor heating unit located in proximity to a foam precursor storage unit, in accordance with another embodiment of the invention.

FIGS. 11–13 illustrate various embodiments of foam precursor heating units in the absence of a foam precursor storage unit. These foam precursor heating units are shown as distinct units. FIGS. 14–16 illustrate various embodiments of foam precursor heating units in proximity to foam precursor storage units. Again the foam precursor heating units are shown as distinct units. It is to be understood that, in other embodiments, all or portions of the foam precursor heating units are integrally formed with the foam precursor storage units and/or the foam containment units.

FIG. 11 illustrates a perspective, exterior view of a foam precursor heating unit 1100, in accordance with an embodiment of the invention. Foam precursor heating unit includes at least one heater component containment unit 1102 and at least one phase change trigger mechanism 1104, in one embodiment.

Heater component containment unit 1102 includes one or more sheets of flexible material, in one embodiment, which are selectively sealed to provide at least one internal compartment within which a heat-producing component (not illustrated) is containable. The material sheets can be formed, for example, from a flexible material which may include one or more layers of polyethylene, polyester, other polymers, polymer resins, metal foil materials, thermoplastic materials, composite materials, other flexible materials, and/or blends or combinations thereof. Variations of the layers are well understood to those of ordinary skill in the polymer arts. In an alternate embodiment, heater component containment unit can be formed from a flexible film, rather than a flexible sheet.

In one embodiment, the heat-producing component includes a chemical composition that experiences a phase change upon the occurrence of an activation event. The phase change (e.g., from a liquid phase to a solid or semi-solid phase) produces thermal energy, at least some of which is used, in one embodiment, to provide activation heat. The activation heat is absorbable by one or more foam precursor components when a foam precursor containment unit is in thermal proximity to the heater component containment unit 1102 and the heat-producing component.

In one embodiment, prior to activation, the heat-producing component includes a supercooled or metastable liquid. A supercooled liquid is a liquid mixture that is coolable below its normal freezing point without changing phase or solidifying. When a supercooled liquid is sufficiently physically agitated, the supercooled liquid undergoes a phase change and solidifies (i.e., crystallizes), thus releasing large amounts of heat at or near the normal melting temperature. In one embodiment, the heat produced is used as activation heat to raise a temperature of one or more foam precursor components.

In one embodiment, the heat-producing component includes a salt solution (e.g., hydrated salts and/or eutectic salts) that is processed such that its temperature can be lowered significantly below its solidification (or melting) temperature, while still remaining in the liquid phase. In one particular embodiment, the heat-producing component includes liquid sodium acetate trihydrate, although other solutions can be used in other embodiments, as would be understood by those of skill in the art understand, based on the description herein.

In one embodiment, a phase change trigger mechanism 1104 is located in proximity to the heat-producing component. In one embodiment, phase change trigger mechanism 1104 includes a physical agitation device immersed in the heat-producing component (i.e., within the heater component containment unit 1102). When sufficient pressure (e.g., via a first user input) is applied to the physical agitation device, it physically agitates the heat-producing component, thus initiating a phase change from a liquid phase to a solid or semi-solid phase. During this phase change, activation heat is produced. In other embodiments, other ways of physically agitating the heat-producing component can be employed.

FIG. 12 illustrates a perspective, exterior view of a foam precursor heating unit 1200, in accordance with another embodiment of the invention. Foam precursor heating unit 1200 includes a first heat precursor compartment 1202 and a second heat precursor compartment 1204, in one embodiment. First and second heat precursor compartments 1202, 1204 form integral portions of foam precursor heating unit 1200, in one embodiment.

Foam precursor heating unit 1200 is formed from one or more sheets of flexible material, in one embodiment, which are selectively sealed to form at least one frangible barrier 1206. The frangible barrier 1206 at least partially defines the first and second heat precursor compartments 1202, 1204, and maintains first and second heat precursors stored within those compartments in separation until one or more openings are formed in the frangible barrier 1206. Such openings are formed, in one embodiment, upon the application of sufficient pressure to the foam precursor heating unit 1200 (e.g., via a first user input). When the openings are formed, the first heat precursor and the second heat precursor combine, and heat is produced. In one embodiment, the precursors combine in one or both compartments 1202, 1204. In another embodiment, the precursors combine in a mixing chamber (not illustrated).

In another embodiment, the first heat precursor compartment and the second heat precursor compartment are not integrally formed, but instead are distinct from one another. For example, but not by way of limitation, the first heat precursor compartment can include a separate containment unit (e.g., a pouch or bubble), which contains the first heat precursor, and which floats within the second heat precursor or is attached to an inner surface of the second heat precursor compartment. In one embodiment, the first heat precursor is released into the second heat precursor when sufficient pressure is applied (e.g., via a first user input) to form an opening within (or break) the pouch or bubble.

In one embodiment, prior to activation, the first heat precursor includes a crystallized counterpart of a supercooled liquid (e.g., a crystallized salt, such as sodium acetate trihydrate), and the second heat precursor includes the supercooled liquid (e.g., a liquefied salt solution, such as liquid sodium acetate trihydrate). When the crystals are introduced into the supercooled liquid, the liquid undergoes a phase change. During solidification, a large amount of heat is produced. Numerous other types of first heat precursors (e.g., air, water, etc.) can be used to cause a phase change, in other alternate embodiments, as would be obvious to those of skill in the art, based on the description herein.

In another embodiment, the first heat precursor includes a fuel (e.g., a metal powder, such as iron) and the second heat precursor includes an oxidizer (e.g., air). When the fuel and the oxidizer are mixed, an exothermic compound is produced, and a chemical reaction occurs which produces a release of heat. Precursors for numerous other exothermic compounds may be used for the first and second heat precursors, in other alternate embodiments, as would be obvious to those of skill in the art, based on the description herein.

In the embodiments described above in conjunction with FIGS. 11 and 12, supercooled liquids and exothermic metal mixtures are used to produce activation heat. The heat precursors used in these embodiments are referred to generically as heat-producing precursors. It would be obvious to those of skill in the art, based on the description herein, that numerous other types of heat-producing precursors could be used, in alternate embodiments, and all such embodiments are intended to be included within the scope of the inventive subject matter.

FIG. 13 illustrates a perspective, exterior view of a foam precursor heating unit 1300, in accordance with another embodiment of the invention. Foam precursor heating unit 1300 includes a heating element 1302, an electrical energy supply device 1304, and an activation mechanism 1306, in one embodiment.

Heating element 1302 includes one or more coils or plates, which radiate heat when electrical energy is supplied to the heating element 1302. Such electrical energy is supplied, in one embodiment, by an electrical energy supply device 1304. The electrical energy supply device 1304 includes a battery, in one embodiment. In other embodiments, the electrical energy supply device 1304 could include a solar energy panel, a connector to a continuous energy supply (e.g., an outlet plug or automobile power adaptor), or another source of electrical energy.

Activation mechanism 1306 is an electrical switch, in one embodiment, which is selectively closable by applying pressure (e.g., via a first user input) to the activation mechanism 1306. When closed, activation mechanism 1306 enables electrical energy to flow from the electrical energy supply device 1304 to the heating element 1302. The heating element 1302 then radiates heat. In one embodiment, the heat is used as activation heat to raise a temperature of one or more foam precursor components to a temperature within an activation temperature range.

Various embodiments of foam precursor heating units have been described in conjunction with FIGS. 11–13. As described previously, when a foam precursor heating unit is located in thermal proximity to a foam precursor storage unit, the foam precursor heating unit can provide activation heat. The activation heat is absorbed by one or more of the foam precursors, thus raising the temperatures of the one or more foam precursors to temperatures within an activation temperature range. Foam production is enhanced when one or more of the foam precursors have attained temperatures within the activation temperature range. FIGS. 14–16 illustrate various embodiments of proximal relationships between foam precursor heating units and foam precursor storage units.

FIG. 14 illustrates a perspective, exterior view of a foam precursor heating unit 1402 located in proximity to a foam precursor storage unit 1404, in accordance with an embodiment of the invention. In the illustrated embodiment, the foam precursor heating unit 1402 can include any of the heating units described in conjunction with FIGS. 11–13 and/or other heating unit embodiments. Similarly, although the foam precursor storage unit 1404 is shown to resemble an embodiment such as that illustrated in FIG. 8, foam precursor storage unit 1404 also could be a storage unit such as those illustrated in FIGS. 6, 7, and 9, or other types of precursor storage units.

In the illustrated embodiment, foam precursor heating unit 1402 substantially surrounds the foam precursor storage unit 1404. Accordingly, foam precursor heating unit 1402 is capable of providing activation heat to both foam precursor components stored in foam precursor compartments 1406, 1408. In an alternate embodiment, the foam precursor storage unit substantially surrounds the foam precursor heating unit.

In one embodiment, foam precursor heating unit 1402 includes a first activation area 1410 at which a heating unit activation mechanism (not illustrated) is located. In various embodiments, as described previously, the heating unit activation mechanism includes a clamp, roller, piercing mechanism, frangible barrier, breakable pouch or bubble, electrical switch, or any of numerous other types of activation mechanisms. When the first activation area is manipulated, in one embodiment, the heating unit 1402 is activated, resulting in the production of activation heat.

Foam precursor storage unit 1404 includes a second activation area 1412, in one embodiment, at which a precursor mixing mechanism (not illustrated) is located. In various embodiments, as described previously, the precursor mixing mechanism includes a plunger, clamp, roller, piercing mechanism, frangible barrier or any of numerous other types of activation mechanisms. When the second activation area is manipulated, in one embodiment, the precursor storage unit 1404 is activated, enabling the foam precursors to combine.

The second activation area 1412 and the first activation area 1410 have sufficient physical separation, in one embodiment, to ensure that manipulation of one of the areas causes activation of either the foam precursor storage unit 1404 or the foam precursor heating unit 1402, as intended, but not both.

FIG. 15 illustrates a perspective, exterior view of a foam precursor heating unit 1502 located in proximity to a foam precursor storage unit 1504, in accordance with another embodiment of the invention. In the illustrated embodiment, the foam precursor heating unit 1502 can include any of the heating units described in conjunction with FIGS. 11–13 and/or other heating unit embodiments. Similarly, although the foam precursor storage unit 1504 is shown to resemble embodiments such as those illustrated in FIGS. 6 and 7, foam precursor storage unit 1504 also could be a storage unit such as those illustrated in FIGS. 8 and 9, or other types of precursor storage units.

In the illustrated embodiment, foam precursor heating unit 1502 substantially surrounds the foam precursor storage unit 1504. Accordingly, foam precursor heating unit 1502 is capable of providing activation heat to both foam precursor components stored in foam precursor compartments 1506, 1508.

In one embodiment, foam precursor heating unit 1502 includes a first activation area 1510 at which a heating unit activation mechanism (not illustrated) is located. In various embodiments, as described previously, the heating unit activation mechanism includes a clamp, roller, piercing mechanism, frangible barrier, breakable pouch or bubble, electrical switch, or any of numerous other types of activation mechanisms. When the first activation area is manipulated, in one embodiment, the heating unit 1502 is activated, resulting in the production of activation heat.

Foam precursor storage unit 1504 includes a second activation area 1512, in one embodiment, at which a precursor mixing mechanism (not illustrated) is located. In various embodiments, as described previously, the precursor mixing mechanism includes a plunger, clamp, roller, piercing mechanism, frangible barrier or any of numerous other types of activation mechanisms. When the second activation area is manipulated, in one embodiment, the precursor storage unit 1504 is activated, enabling the foam precursors to combine.

The second activation area 1512 and the first activation area 1510 have sufficient physical separation, in one embodiment, to ensure that manipulation of one of the areas causes activation of either the foam precursor storage unit 1504 or the foam precursor heating unit 1502, as intended, but not both.

FIG. 16 illustrates a perspective, exterior view of a foam precursor heating unit 1602 located in proximity to a foam precursor storage unit 1604, in accordance with another embodiment of the invention. In the illustrated embodiment, the foam precursor heating unit 1602 can include any of the heating units described in conjunction with FIGS. 11–13 and/or other heating unit embodiments. Similarly, although the foam precursor storage unit 1604 is shown to resemble embodiments such as those illustrated in FIGS. 6 and 7, foam precursor storage unit 1604 also could be a storage unit such as those illustrated in FIGS. 8 and 9, or other types of precursor storage units.

In the illustrated embodiment, foam precursor heating unit 1602 contacts a surface of the foam precursor storage unit 1604 outside one foam precursor compartment 1606. Accordingly, foam precursor heating unit 1602 is capable of providing significant activation heat to a foam precursor component stored in foam precursor compartment 1606, but does not provide a significant amount of activation heat to a foam precursor component stored in foam precursor compartment 1608. FIG. 16 is included to illustrate that fewer than all foam precursor components may be pre-heated while still achieving enhanced foam production.

As with other embodiments described previously, foam precursor heating unit 1602 includes a first activation area 1610 at which a heating unit activation mechanism (not illustrated) is located. When the first activation area is manipulated, in one embodiment, the heating unit 1602 is activated, resulting in the production of activation heat. Foam precursor storage unit 1604 includes a second activation area 1612, in one embodiment, at which a precursor mixing mechanism (not illustrated) is located. When the second activation area is manipulated, in one embodiment, the precursor storage unit 1604 is activated, enabling the foam precursors to combine.

As FIGS. 14–16 illustrate, a foam precursor heating unit and a foam precursor storage unit can be physically oriented, with respect to each other, in a number of ways. In one embodiment, a foam precursor heating unit substantially surrounds all or portions of a precursor storage unit. In another embodiment, a foam precursor heating unit contacts one or more surfaces of a precursor storage unit. In still another embodiment, a foam precursor heating unit is located entirely or partially within one or more of the chambers of precursor storage unit. In still another embodiment, a precursor storage unit substantially surrounds all or portions of foam precursor heating unit. In still another embodiment, a precursor heating unit is located between the one or more chambers of precursor storage unit.

In one embodiment, one or more foam precursor heating units are arranged so that they provide significant activation heat to two or more foam precursor components. In another embodiment, one or more foam precursor heating units are arranged so that they provide significant activation heat to only one foam precursor component.

Some of the illustrated embodiments show a foam precursor heating unit in contact with one surface of a foam precursor storage unit. Other illustrated embodiments show a foam precursor heating unit substantially surrounding a foam precursor storage units. These illustrations are for example purposes, and are not to be construed as limiting the scope of the inventive subject matter. Instead, it is to be understood that numerous proximal relationships can exist between a foam precursor heating unit and a foam precursor storage unit. For example, but not by way of limitation, a foam precursor heating unit can contact from one to substantially all surfaces of a foam precursor storage unit. Additionally, all or portions of a foam precursor heating unit can be located within the interior of a foam precursor storage unit.

As mentioned previously, a foam precursor storage unit and a foam precursor heating unit can be distinct units, or they can be integrated together, in various embodiments. For example, but not by way of limitation, a foam precursor heating unit can be attached to or held in proximity to a foam precursor storage unit. Alternatively, portions of a foam precursor heating unit can be integrally formed with portions of a foam precursor storage unit. In some embodiments, the foam precursor heating unit and the foam precursor storage unit can share physical structures that define their various compartments (e.g., a material wall can define a foam precursor compartment on one surface and a heat precursor compartment on an opposite surface). Any and all such alternative embodiments that would be obvious to one of skill in the art, based on the description herein, are intended to be included within the scope of the inventive subject matter.

Figure 17:
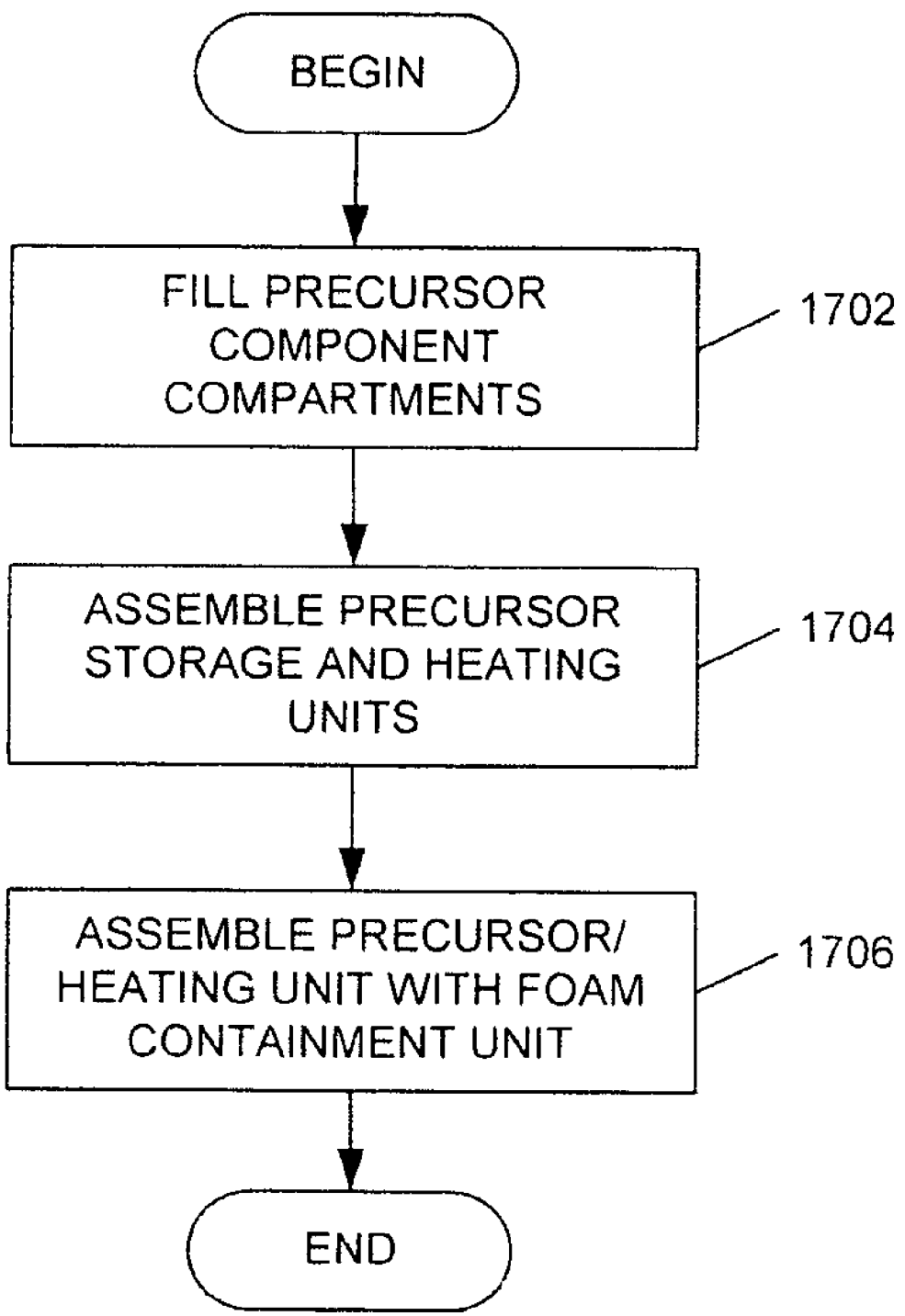
FIG. 17 illustrates a flowchart of a method for manufacturing a rigid-setting foam apparatus, in accordance with an embodiment of the invention.

FIG. 17 illustrates a flowchart of a method for manufacturing a rigid-setting foam apparatus, in accordance with an embodiment of the invention. It is to be understood that the processes depicted in FIG. 17 can be performed sequentially or in parallel. In addition, the order of the processes depicted in FIG. 17 can be modified while still achieving the same result.

The method begins, in block 1702, by substantially or partially filling precursor component compartments of a foam precursor storage unit with two or more foam precursor components. The filling process can be performed before, during, and/or after processes of forming one or more seals in the foam precursor storage unit.

In block 1704, one or more foam precursor storage units are assembled with one or more foam precursor heating units. In one embodiment, this includes bringing a foam precursor storage unit in physical proximity with a foam precursor heating unit. In another embodiment, the foam precursor storage unit and the foam precursor heating unit have portions that are integrally formed, and thus a distinct assembling process is not necessary.

In block 1706, the foam precursor storage/heating assembly resulting from block 1704 is further assembled with a foam containment unit. In one embodiment, this involves attaching the foam precursor storage/heating assembly to an inside surface of a foam containment unit. In another embodiment, this involves attaching the foam precursor storage/heating assembly to a delivery mechanism and/or to a connector and/or to an opening in the outside surface of a foam containment unit. In still another embodiment, the foam precursor storage unit and the foam containment unit are integrally formed, and thus a distinct assembling process is not necessary. The method then ends.

In still another embodiment, the foam precursor storage unit, the foam precursor heating unit, and/or the foam containment unit are provided to an end-user as a kit. Accordingly, some or all of the processes depicted in FIG. 17 can be omitted by the manufacturer.

The various embodiments of foam-in-place apparatus can be used in a number of different applications. For example, but not by way of limitation, embodiments of the invention can be used to immobilize objects within a shipping container or elsewhere, to immobilize body parts (e.g., as a splint) or other animate objects, or to create a three-dimensional structure of a desired shape "on demand." Because polyurethane foam is buoyant, such structures include floatation devices and/or buoys, in one embodiment.

Figure 18:
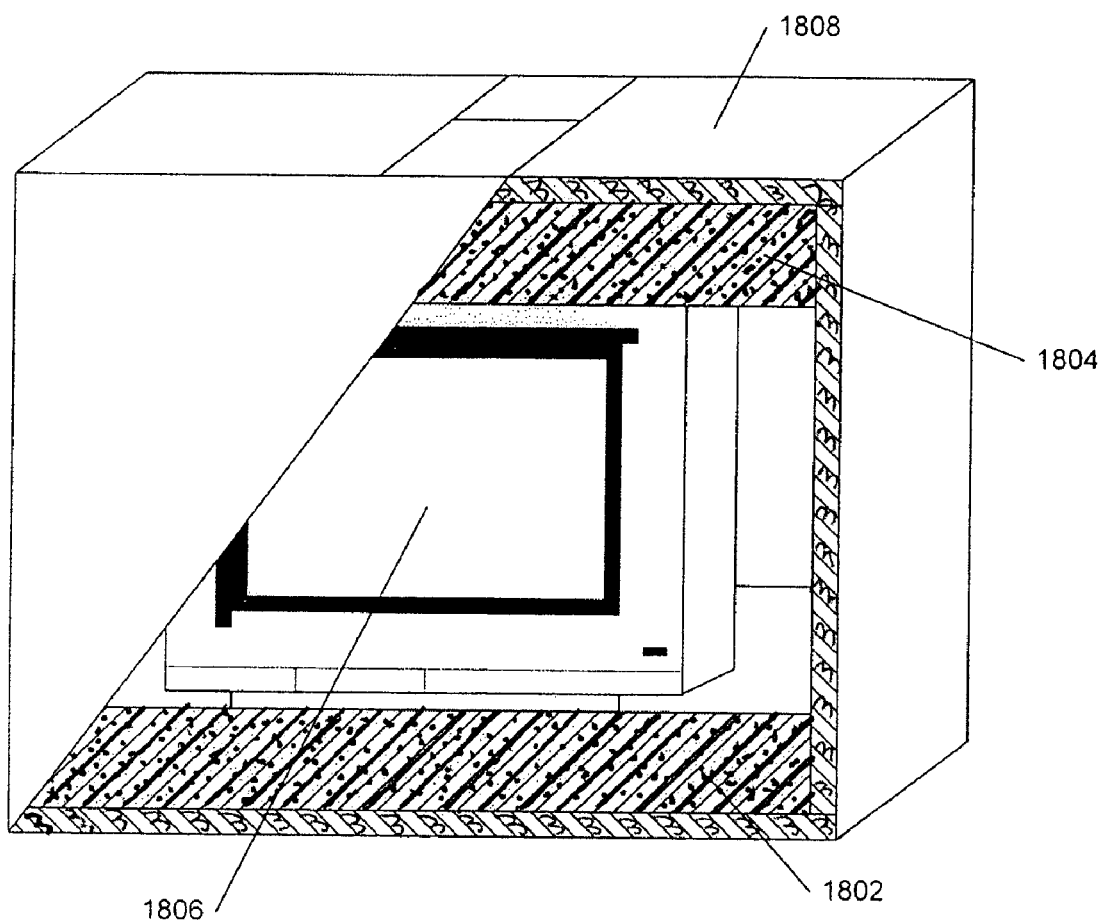
FIG. 18 illustrates a perspective view of a foam-in-place apparatus, after activation, adapted to provide padding within a shipping container, in accordance with an embodiment of the invention.

FIG. 18 illustrates a perspective, cut-away view of foam-in-place apparatus 1802, 1804, after activation, adapted to provide padding for an object 1806 within a shipping container 1808, in accordance with an embodiment of the invention. In one embodiment, a first foam-in-place apparatus 1802 is activated and placed in the shipping container 1808. The first foam-in-place apparatus 1802 will contact interior surfaces of the shipping container 1808.

During foam formation or thereafter, an object 1806 (in this case a monitor) is placed on or near the first foam-in-place apparatus 1802. If the foam has not yet hardened completely, the first foam-in-place apparatus 1802 will contour around a portion of the object 1806. If the foam has hardened, the object 1806 may rest against the first foam-in-place apparatus 1802.

A second foam-in-place apparatus 1804 is activated and placed in proximity to the object 1806. The shipping container 1808 may then be closed. The second foam-in-place apparatus 1804 will contour around a portion of the object 1806 and may also contact interior surfaces of the shipping container 1808. After the foam has hardened, the object 1806 is at least partially immobilized within the shipping container 1808.

Figure 19:
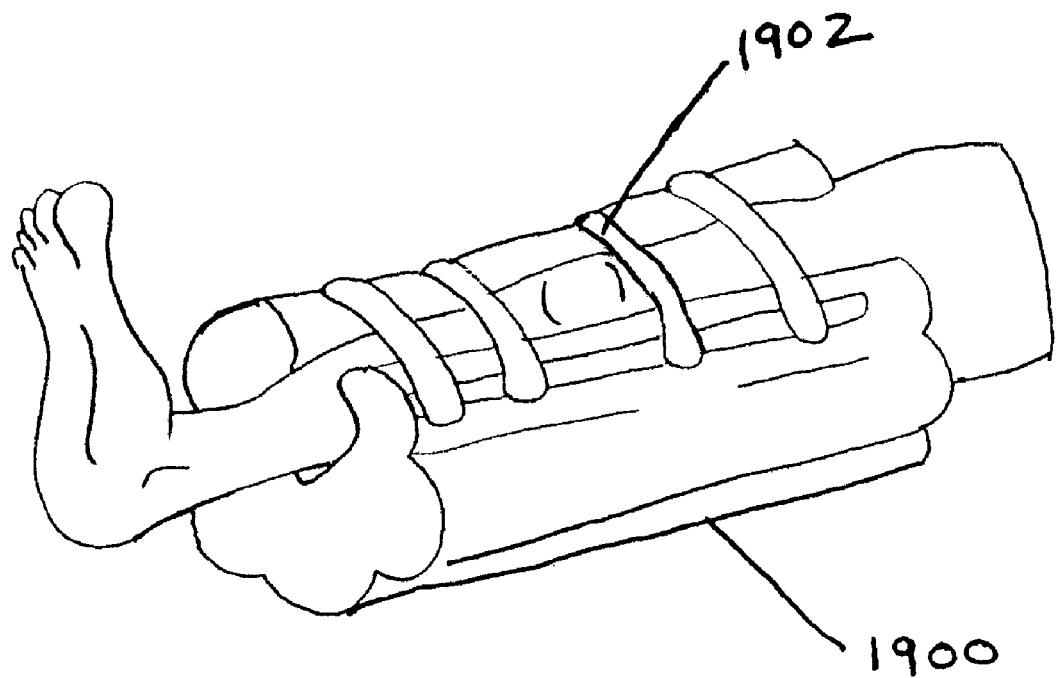
FIG. 19 illustrates a perspective view of a foam-in-place apparatus, after activation, adapted to provide a splint for a body part, in accordance with another embodiment of the invention.

FIG. 19 illustrates a perspective view of a foam-in-place apparatus 1900, after activation, adapted to provide a splint for a body part, in accordance with another embodiment of the invention. In one embodiment, one or more foam-in-place apparatus 1900 are placed in proximity to the body part being immobilized (e.g., a leg (as shown), an arm, a finger, a head/neck, etc.). The apparatus 1900 may then be loosely secured (e.g., using straps 1902 or other securement mechanisms).

The foam-in-place apparatus 1900 is then activated, and the expanding foam within the apparatus causes the apparatus to contour around the body part being immobilized. Once the foam hardens, the body part will be effectively immobilized. In one embodiment, the apparatus 1900 is designed so that it will not completely surround the body part, thus making subsequent removal of the apparatus 1900 easier, and less likely to cause damaging manipulation to the body part.

Figure 20:
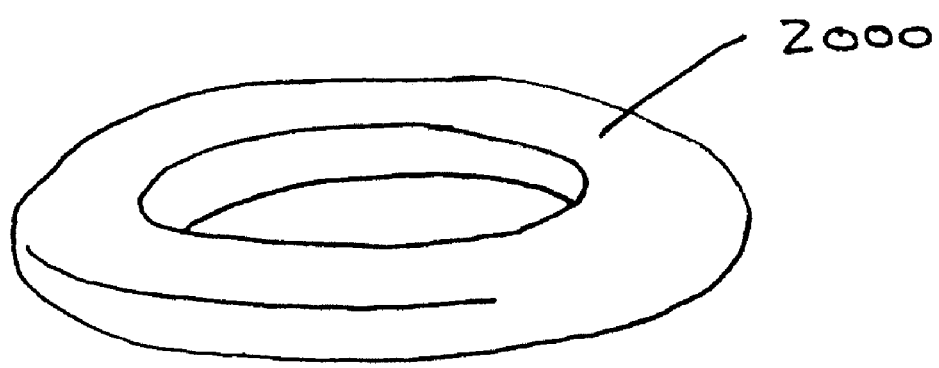
FIG. 20 illustrates a perspective view of an embodiment of the invention, after activation, adapted to produce a flotation device, in accordance with another embodiment of the invention.

FIG. 20 illustrates a perspective view of an embodiment of the invention, after activation, adapted to produce a flotation device 2000, in accordance with another embodiment of the invention. In one embodiment, the flotation device 2000 is a lifesaving ring, as illustrated. In other embodiments, the flotation device could include a kickboard, a raft, a buoy, or another type of device.

In order to produce the flotation device 2000, a foam-in-place apparatus having a foam containment unit of an appropriate shape is activated. As long as the foam containment unit is permitted to expand to its expansion limits in the absence of interfering objects, the foam containment unit will expand to a desired shape. Once the foam hardens, a rigid and buoyant flotation device 2000 is formed.

Foam containment units can be designed to produce other desired three-dimensional structures, in other embodiments. Accordingly, use of the embodiments of the invention is not intended to be limited by the example applications given above.

Thus, various embodiments of methods and apparatus for immobilizing objects and producing rigid, three-dimensional structures using foam-in-place apparatus have been described. The inventive subject matter is not to be construed as being limited to any particular configuration of its component parts. The inventive subject matter's use is extremely flexible, being readily adaptable to any application in which its advantages are desired to be achieved. The apparatus and methods depicted in the Figures are merely examples of applications in which the inventive subject matter can be used.

Many variations of the apparatus diagrams appearing in the drawings will be apparent to those skilled in the art having the benefit of this disclosure. For example, where material "sheets" are described above, material "films" could alternatively be used, and vice versa. In addition, where various components and elements are illustrated singularly in the illustrated configurations, multiple ones of some or all of the components and/or elements may be included in alternate configurations.

The foregoing description of specific embodiments reveals the general nature of the inventive subject matter sufficiently that others can, by applying current knowledge, readily modify and/or adapt it for various applications without departing from the generic concept. Therefore, such adaptations and modifications are within the meaning and range of equivalents of the disclosed embodiments. The phraseology or terminology employed herein is for the purpose of description and not of limitation. Therefore, it is manifestly intended that the inventive subject matter be limited only by the claims and the equivalents thereof.

It is emphasized that the Abstract is provided to comply with 37 C.F.R. §1.72(b), which requires an Abstract that will allow a reader to ascertain the nature and gist of the technical disclosure. The Abstract is submitted with the understanding that it will not be used to interpret or limit the scope or meaning of the claims.

In the foregoing Detailed Description, various features are occasionally grouped together in a single embodiment for the purpose of streamlining the disclosure. This method of disclosure is not to be interpreted as reflecting an intention that the claimed embodiments of the subject matter require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate preferred embodiment.

What is claimed is:

1. An apparatus comprising:
   a foam containment unit adapted to contain a foam produced from a combination of at least two foam precursor components;
   a foam precursor storage unit, which includes a first compartment adapted to hold a first foam precursor component, and a second compartment adapted to hold a second foam precursor component until the first foam precursor component and the second foam precursor component are released; and
   a foam precursor heating unit, forming a portion of the apparatus, located in contact with and in thermal proximity to the foam precursor storage unit and operable to provide thermal energy for increasing a temperature of one or more of the at least two foam precursor components.

2. The apparatus of claim 1, wherein the foam precursor storage unit and the foam precursor heating unit are located within an interior cavity of the foam containment unit.

3. The apparatus of claim 1, wherein the foam precursor storage unit and the foam precursor heating unit are located outside the foam containment unit.

4. The apparatus of claim 3, wherein the apparatus further comprises a delivery mechanism adapted to deliver the first foam precursor component and the second foam precursor component to an interior cavity of the foam containment unit.

5. An apparatus comprising:
   a foam containment unit adapted to contain a foam produced from a combination of at least two foam precursor components;
   a foam precursor storage unit, which includes a first compartment adapted to hold a first foam precursor component, and a second compartment adapted to hold a second foam precursor component until the first foam precursor component and the second foam precursor component are released;
   a foam precursor heating unit, forming a portion of the apparatus, located in contact with and in thermal proximity to the foam precursor storage unit and operable to provide thermal energy for increasing a temperature of one or more of the at least two foam precursor components;
   the first foam precursor component, which includes diisocyanate; and
   the second foam precursor component, which includes a polyol.

6. The apparatus of claim 1, wherein the foam precursor storage unit includes a top portion and a bottom portion formed from a flexible material.

7. The apparatus of claim 6, further comprising a mixing chamber adapted to receive and mix the first foam precursor and the second foam precursor.

8. The apparatus of claim 1, wherein the foam precursor storage unit includes:
   a top portion formed from a flexible material; and
   a bottom portion formed from a substantially rigid material.

9. The apparatus of claim 8, further comprising a mixing chamber adapted to receive and mix the first foam precursor and the second foam precursor.

10. The apparatus of claim 1, wherein the foam precursor storage unit includes:
    a syringe having a first compartment adapted to contain the first foam precursor component, and a second compartment adapted to contain the second foam precursor component; and
    a plunger for extruding the first foam precursor and the second foam precursor.

11. The apparatus of claim 10, further comprising a mixing chamber adapted to receive and mix the first foam precursor and the second foam precursor.

12. The apparatus of claim 1, wherein the foam precursor heating unit comprises:
    a first compartment adapted to contain a first heat-producing component; and
    a phase change trigger mechanism located in proximity to the first compartment, which is adapted to agitate the first heat-producing component in response to a triggering event, and wherein agitation of the first heat-producing component results in an exothermic reaction.

13. The apparatus of claim 12, wherein the phase change trigger mechanism includes a physical agitation device.

14. The apparatus of claim 1, wherein the foam precursor heating unit comprises:
    a first compartment adapted to contain a first heat precursor component;
    a second compartment adapted to contain a second heat precursor component; and
    a mechanism that enables the first heat precursor component and the second heat precursor component to combine in response to a triggering event, and wherein a combination of the first heat precursor component and the second heat precursor component produces an exothermic reaction.

15. The apparatus of claim 14, wherein the mechanism includes a frangible barrier.

16. The apparatus of claim 14, wherein the mechanism includes a separate containment unit.

17. The apparatus of claim 14, further comprising:
    the first heat precursor component, which includes a fuel; and
    the second heat precursor component, which includes an oxidizer.

18. The apparatus of claim 1, wherein the foam precursor heating unit comprises:
    a heating element.

19. The apparatus of claim 18, wherein the foam precursor heating unit further comprises:
    an electrical energy supply device; and
    an activation mechanism.

20. The apparatus of claim 19, wherein:
    the heating element includes a coil;
    the electrical energy supply device includes a battery; and
    the activation mechanism includes a switch.

21. An apparatus comprising:
a foam containment unit adapted to contain a foam produced from a combination of at least two foam precursor components;
a foam precursor storage unit, which includes a first compartment adapted to hold a first foam precursor component, and a second compartment adapted to hold a second foam precursor component until the first foam precursor component and the second foam precursor component are released; and
a foam precursor heating unit, forming a portion of the apparatus, and located in contact with and in thermal proximity to the foam precursor storage unit and operable to provide thermal energy for increasing a temperature of one or more of the at least two foam precursor components, wherein the foam precursor heating unit includes
a first compartment adapted to contain a first heat-producing component, and
a phase change trigger mechanism located in proximity to the first compartment, which is adapted to agitate the first heat-producing component in response to a triggering event, and wherein agitation of the first heat-producing component results in an exothermic reaction.

22. The apparatus of claim 21, further comprising the first heat-producing component, wherein the first heat-producing component includes a supercooled liquid.

23. The apparatus of claim 21, wherein the phase change trigger mechanism includes a physical agitation device.

24. An apparatus comprising:
a foam containment unit adapted to contain a foam produced from a combination of at least two foam precursor components;
a foam precursor storage unit, which includes a first compartment adapted to hold a first foam precursor component, and a second compartment adapted to hold a second foam precursor component until the first foam precursor component and the second foam precursor component are released; and
a foam precursor heating unit, forming a portion of the apparatus, and located in contact with and in thermal proximity to the foam precursor storage unit and operable to provide thermal energy for increasing a temperature of one or more of the at least two foam precursor components, wherein the foam precursor heating unit includes
a first compartment adapted to contain a first heat precursor component,
a second compartment adapted to contain a second heat precursor component, and
a mechanism that enables the first heat precursor component and the second heat precursor component to combine in response to a triggering event, and wherein a combination of the first heat precursor component and the second heat precursor component produces an exothermic reaction.

25. An apparatus comprising:
a foam containment unit adapted to contain a foam produced from a combination of at least two foam precursor components;
a foam precursor storage unit, which includes a first compartment adapted to hold a first foam precursor component, and a second compartment adapted to hold a second foam precursor component until the first foam precursor component and the second foam precursor component are released; and
a foam precursor heating unit, forming a portion of the apparatus, located in contact with and in thermal proximity to the foam precursor storage unit and operable to provide thermal energy for increasing a temperature of one or more of the at least two foam precursor components, wherein the foam precursor heating unit includes
a first compartment adapted to contain a first heat precursor component,
a second compartment adapted to contain a second heat precursor component,
a mechanism that enables the first heat precursor component and the second heat precursor component to combine in response to a triggering event, and wherein a combination of the first heat precursor component and the second heat precursor component produces an exothermic reaction,
the first heat precursor component, which includes a supercooled liquid, and
the second heat precursor component, which includes a crystallized counterpart of the supercooled liquid.

26. An apparatus comprising:
a foam containment unit adapted to contain a foam produced from a combination of at least two foam precursor components;
a foam precursor storage unit, which includes a first compartment adapted to hold a first foam precursor component, and a second compartment adapted to hold a second foam precursor component until the first foam precursor component and the second foam precursor component are released; and
a foam precursor heating unit, forming a portion of the apparatus, located in contact with and in thermal proximity to the foam precursor storage unit and operable to provide thermal energy for increasing a temperature of one or more of the at least two foam precursor components, wherein the foam precursor heating unit includes
a first compartment adapted to contain a first heat precursor component,
a second compartment adapted to contain a second heat precursor component,
a mechanism that enables the first heat precursor component and the second heat precursor component to combine in response to a triggering event, and wherein a combination of the first heat precursor component and the second heat precursor component produces an exothermic reaction,
the first heat precursor component, which includes a fuel, and
the second heat precursor component, which includes an oxidizer.

27. An apparatus comprising:
a foam containment unit adapted to contain a foam produced from a combination of at least two foam precursor components;
a foam precursor storage unit, which includes a first compartment adapted to hold a first foam precursor component, and a second compartment adapted to hold a second foam precursor component until the first foam precursor component and the second foam precursor component are released; and
a foam precursor heating unit, forming a portion of the apparatus, located in contact with and in thermal proximity to the foam precursor storage unit and operable to provide thermal energy for increasing a temperature of one or more of the at least two foam precursor components, wherein the foam precursor heating unit includes a heating element.

28. The apparatus of claim 27, wherein the foam precursor heating unit further comprises:
an electrical energy supply device; and
an activation mechanism.

29. The apparatus of claim 28, wherein:
the heating element includes a coil;
the electrical energy supply device includes a battery; and
the activation mechanism includes a switch.

* * * * *